US011786887B2

(12) United States Patent
Hemgesberg et al.

(10) Patent No.: US 11,786,887 B2
(45) Date of Patent: Oct. 17, 2023

(54) AQUEOUS SUSPENSION COMPRISING A ZEOLITIC MATERIAL AND A ZIRCONIUM CHELATE COMPLEX

(71) Applicants: BASF SE, Ludwigshafen am Rhein (DE); BASF CORPORATION, Florham Park, NJ (US)

(72) Inventors: Maximilian Hemgesberg, Leverkusen (DE); Meik Ranft, Ludwigshafen (DE); Edith Schneider, Nienburg/Weser (DE); Marko Buchholz, Nienburg/Weser (DE); Maik Schlesinger, Ludwigshafen (DE); Denis Schwall, Ludwigshafen (DE); Yi Liu, Huntsville, AL (US)

(73) Assignees: BASF SE, Ludwigshafen am Rhein (DE); BASF Corporation, Florham Park, NJ (US)

( * ) Notice: Subject to any disclaimer, the term of this patent is extended or adjusted under 35 U.S.C. 154(b) by 83 days.

(21) Appl. No.: 17/309,443

(22) PCT Filed: Dec. 6, 2019

(86) PCT No.: PCT/EP2019/084082
§ 371 (c)(1),
(2) Date: May 27, 2021

(87) PCT Pub. No.: WO2020/115318
PCT Pub. Date: Jun. 11, 2020

(65) Prior Publication Data
US 2022/0023849 A1 Jan. 27, 2022

(30) Foreign Application Priority Data
Dec. 6, 2018 (EP) .................... 18210724

(51) Int. Cl.
B01J 29/072 (2006.01)
B01J 29/76 (2006.01)
B01D 53/94 (2006.01)
B01J 35/02 (2006.01)
B01J 37/02 (2006.01)
B01J 37/04 (2006.01)
F01N 3/20 (2006.01)
F01N 3/28 (2006.01)

(52) U.S. Cl.
CPC ........ *B01J 29/763* (2013.01); *B01D 53/9418* (2013.01); *B01J 35/023* (2013.01); *B01J 37/0219* (2013.01); *B01J 37/04* (2013.01); *F01N 3/2066* (2013.01); *F01N 3/2803* (2013.01); *B01D 2255/20715* (2013.01); *B01D 2255/20738* (2013.01); *B01D 2255/20761* (2013.01); *B01D 2255/50* (2013.01); *B01D 2255/9202* (2013.01); *F01N 2370/04* (2013.01)

(58) Field of Classification Search
None
See application file for complete search history.

(56) References Cited

U.S. PATENT DOCUMENTS

| 5,275,759 | A | 1/1994 | Osaka et al. |
|---|---|---|---|
| 2010/0081563 | A1 | 4/2010 | Edgar-Beltran et al. |
| 2015/0298098 | A1 | 10/2015 | Gramiccioni et al. |
| 2019/0143296 | A1* | 5/2019 | Choi ................ B01J 20/28033 95/51 |

FOREIGN PATENT DOCUMENTS

| CN | 102612403 | * | 7/2012 |
|---|---|---|---|
| CN | 103945936 | * | 7/2014 |
| CN | 107376990 | * | 11/2017 |
| CN | 107949436 | * | 4/2018 |
| JP | 2014198319 | * | 10/2014 |
| JP | 2015044720 | * | 3/2015 |
| KR | 20110120875 | * | 11/2011 |
| WO | WO 2015/195819 A1 | | 12/2015 |
| WO | WO 2018/104310 A1 | | 6/2018 |

OTHER PUBLICATIONS

Lewis, R.J. Sr. Hawley's Condensed Chemical Dictionary 15th ed. Pub Chem. Zirconium Acetate. New York. 2007 (Year: 2007).*
Sigma-Aldrich. Safety Data Sheet. Zirconium Acetate Solution. 2020. (Year: 2020).*
International Search Report dated Feb. 13, 2020, for International Application No. PCT/EP2019/084082.

* cited by examiner

Primary Examiner — Sheng H Davis
(74) Attorney, Agent, or Firm — DLA Piper LLP (US)

(57) ABSTRACT

An aqueous suspension comprising water, a zeolitic material and one or more of copper and iron, and a chelate complex comprising a zirconium ion and a bidentate organic ligand bonded to said zirconium ion via zirconium oxygen bonds from two oxygen atoms comprised in said ligand, said chelate complex being dissolved in the water.

17 Claims, No Drawings

US 11,786,887 B2

AQUEOUS SUSPENSION COMPRISING A ZEOLITIC MATERIAL AND A ZIRCONIUM CHELATE COMPLEX

This application is a U.S. national stage entry application under 35 U.S.C. § 371 from PCT International Application No. PCT/EP2019/084082, filed on Dec. 6, 2019, which claims priority to EP Patent Application No. 18210724.3, filed on Dec. 6, 2018; the contents of each application is incorporated herein by reference in its entirety.

The present invention relates to an aqueous suspension comprising a zeolitic material and a zirconium chelate complex for use in the manufacture of exhaust system catalysts. More specifically, the inventive suspensions provide improvements in rheology properties for systems suitable for the production of SCR catalysts.

Conventional suspensions for SCR catalyst preparation fail to deliver satisfactory coating performance due to problems with the rheology properties of current suspensions systems. More specifically, conventional suspension formulations lead to gel like behavior in weakly acidic to basic pH ranges that interferes with the coating of the monolithic substrates commonly used in exhaust gas treatment. Thus the increased viscosities encountered with conventional systems having solids contents in excess of 40 weight-% dry solids loading leads to a lower reproducibility of the coatings and increase the scrap rate of catalysts that do not meet quality control standards as well as increasing the cost of production. Without the intention of being bound by theory, zirconium sources used as adhesion promoters for fixing the SCR catalyst materials to the substrate are believed to form gels in weakly acidic to basic pH ranges and are thought to contribute to the gel like behavior of the suspension formulations.

It was therefore an object of the present invention to provide a suspension that improved the viscosity profile at solids loadings of greater than 40 weight-% solids content in the presence of zirconium. It was a further object of the present invention to provide a suspension formulation that allows for the avoidance of zirconium sol gel formation. It was a further object of the present invention to provide a suspension formulation that showed improved stability. It was a further object of the invention to provide a suspension that allowed for higher shear rates, specifically to provide a suspension that lowers the viscosity at higher shear rates. It was a further object of the present invention to provide a method to produce a suspension that shows improved viscosity. It was a further object of the present invention to provide a method to produce a suspension that avoids zirconium sol gels.

Surprisingly, it was found that by use of an appropriate alpha hydroxy acid as a zirconium ligand, SCR catalyst suspensions that comprise zirconium showed improved viscosity and stability in comparison to suspensions that lacked the alpha hydroxy acid.

Therefore, the present invention relates an aqueous suspension comprising:
(i) water;
(ii) a zeolitic material and one or more of copper and iron, wherein the one or more of copper and iron is either comprised in the zeolitic material, or in a source of one or more of copper and iron, or in the zeolitic material and in a source of one or more of copper and iron;
(iii) a chelate complex comprising a zirconium ion and a bidentate organic ligand bonded to said zirconium ion via zirconium oxygen bonds from two oxygen atoms comprised in said ligand, said chelate complex preferably being dissolved in the water.

Preferably, the water provided in (i) is deionized. More preferably, the water according to (i) has a conductivity in the range of from 50 to 4000 microSiemens/cm, more preferably in the range of from 100 to 3000 microSiemens/cm, more preferably in the range of from 150 to 200 microSiemens/cm, determined as described in Reference Example 6.

Preferably, the zeolitic material according to (ii) has framework type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF,*-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, or a mixed type of two or more thereof, preferably AEI, GME, CHA, MFI, BEA, FAU, MOR, a mixture of two or more thereof or a mixed type of two or more thereof, more preferably AEI, GME, CHA, FAU, MOR, a mixture of two or more thereof or a mixed type of two or more thereof, more preferably AEI, CHA, BEA, a mixture of two or more thereof or a mixed type of two or more thereof, more preferably CHA or AEI. More preferably, the zeolitic material according to (ii) has framework type CHA.

Preferably, from 95 to 100 weight-%, more preferably from 98 to 100 weight-%, more preferably from 99 to 100 weight-% of the framework structure of the zeolitic material according to (ii) consists of Si, Al, O, and optionally one or more of H and P.

Preferably, the molar ratio of Si to Al in the framework structure of the zeolitic material according to (ii), calculated as $SiO_2:Al_2O_3$, is in the range of from 2:1 to 50:1, more preferably in the range of from 5:1 to 50:1, more preferably in the range of from 10:1 to 45:1, more preferably in the range of from 11:1 to 40:1, more preferably in the range of from 12:1 to 38:1, more preferably in the range of from 13:1 to 35:1.

Preferably, according to (ii), the suspension comprises a zeolitic material and copper, wherein the copper is either comprised in the zeolitic material, or in a source of copper, or in the zeolitic material and in a source of copper.

According to a first embodiment of the present invention wherein according to (ii), the suspension comprises a zeolitic material and copper, it is preferred that the zeolitic material according to (ii) comprises copper. More preferably, the zeolitic material according to (ii) comprises copper in an amount, calculated as CuO, in the range of from 1 to 10 weight-%, preferably in the range of from 1.5 to 8 weight-%, more preferably in the range of from 1.8 to 6 weight-%, more preferably in the range of from 2 to 5.5 weight-%, more preferably in the range of from 2 to 5 weight-%, more preferably in the range of from greater than 2 to less than 5 weight-%, more preferably in the range of from 2.1 to 4.9 weight-%, more preferably in the range of from 2.2 to 4.8 weight-%, based on the total weight of the framework Si, Al and O of the zeolitic material.

According to this first embodiment of the present invention, it is preferred that the suspension according to (ii) does not comprise a source of copper in addition to the zeolitic material comprising copper. Preferably, the amount of copper comprised in the zeolitic material according to (ii), calculated as CuO, is in the range of from 0.1 to 3 weight-%, preferably in the range of from 0.2 to 2 weight-%, more preferably in the range of from 0.5 to 1.75 weight-%, based on the total weight of the framework Si, Al and O of the zeolitic material.

Further according to this first embodiment, it is also preferred that in addition to the zeolitic material, the suspension according to (ii) comprises a source of copper. The source of copper is preferably selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO. Preferably, the suspension according to (ii) comprises the copper source, calculated as CuO, in an amount in the range of from 1 to 10 weight-%, preferably in the range of from 1.5 to 5 weight-%, more preferably in the range of from 1.5 to 4 weight-%, based on the total weight of the framework Si, Al and O of the zeolitic material comprised in the aqueous suspension.

According to a second embodiment of the present invention wherein according to (ii), the suspension comprises a zeolitic material and copper, it may be preferred that the amount of copper comprised in the zeolitic material according to (ii), calculated as CuO, is in the range of from 0 to less than 0.1 weight-%, preferably in the range of from 0 to 0.01 weight-%, more preferably in the range of from 0 to 0.001 weight-%, based on the the total weight of the framework Si, Al and O of the zeolitic material, wherein more preferably, the zeolitic material according to (ii) is free of copper, and wherein in addition to the zeolitic material, the aqueous suspension comprises a source of copper, preferably selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO. Preferably, the suspension according to (ii) comprises the source of copper, calculated as CuO, in an amount in the range of from 1 to 13 weight-%, preferably in the range of from 1.5 to 8 weight-%, more preferably in the range of from 2 to 6 weight-%, based on the total weight of the framework Si, Al and O of the zeolitic material comprised in the aqueous suspension.

According to the present invention, it is further preferred that the zeolitic material according to (ii) is substantially free from platinum group metals and noble metals. Noble metals are defined as one or more of Ru, Re, Rh, Pd, Ag, Os, Ir, Pt and Au. Platinum group metals are defined as one or more of Ru, Rh, Pd, Ir and Pt. More specifically, it is further preferred that the zeolitic material according to (ii) is substantially free from Pd, Pt and Rh. It will be apparent to one skilled in the art that some traces of platinum group and noble group metals as well as other transition metals may be present but in amounts that do not affect catalysis such that substantially free is defined as preferably less than 2% by weight, more preferably less than 1% by weight, more preferably less than 500 ppm by weight, more preferably less than 100 ppm by weight, calculated on the basis of the total amount of transition metals by weight present in the zeolitic material according to (ii) or to all components present in the aqueous suspension based on the mass of the zeolitic material present in the suspension.

Preferably, in case the suspension according to (ii) comprises a zeolitic material and copper, the amount of iron comprised in the suspension according to (ii), calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the framework Si, Al and O of the zeolitic material. Preferably, from 95 to 100 weight-%, more preferably from 98 to 100 weight-%, more preferably from 99 to 100 weight-%, more preferably from 99.5 to 100 weight-%, more preferably from 99.9 to 100 weight-% of the zeolitic material according to (ii) consist of Si, Al, O, optionally Cu, and optionally one or more of H and P.

According to a further aspect of the present invention, it may be preferred that suspension according to (ii) comprises the zeolitic material and iron. In this case, it may be preferred that the zeolitic material according to (ii) comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the framework Si, Al and O of the zeolitic material, wherein preferably from 95 to 100 weight-%, more preferably from 98 to 100 weight-%, more preferably from 99 to 100 weight-% of the framework structure of the zeolitic material consists to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 5:1 to 48:1, more preferably in the range of from 10:1 to 45:1, more preferably in the range of from 11:1 to 40:1, more preferably in the range of from 12:1 to 38:1, more preferably in the range of from 13:1 to 35:1. According to a first alternative in this case wherein the suspension according to (ii) comprises a zeolitic material and iron, the amount of copper comprised in the suspension according to (ii), calculated as CuO, is in the range of from 0 to 0.01 weight-%, more preferably in the range of from 0 to 0.001 weight-%, more preferably in the range of from 0 to 0.0001 weight-%, based on the total weight of the framework Si, Al and O of the zeolitic material. According to a second alternative in this case wherein the suspension according to (ii) comprises a zeolitic material and iron, the amount of copper comprised in the suspension according to (ii), calculated as CuO, is in the range of from 1 to 10 weight-%, preferably in the range of from 1.5 to 8 weight-%, more preferably in the range of from 1.8 to 6 weight-%, more preferably in the range of from 2 to 5.5 weight-%, more preferably in the range of from 2 to 5 weight-%, more preferably in the range of from greater than 2 to less than 5 weight-%, more preferably in the range of from 2.1 to 4.9 weight-%, more preferably in the range of from 2.2 to 4.8 weight-%, based on the total weight of the framework Si, Al and O of the zeolitic material.

Preferably, the mean crystallite size of the zeolitic material according to (ii) is at least 50 nanometer, more preferably in the range of from 50 to 250 nanometer, more preferably in the range of from 70 to 200 nanometer, as determined by X-ray diffraction described in Reference Example 1.

Preferably, the zeolitic material according to (ii) has a particle size distribution with a Dv90 value in the range of from 0.5 to 100 micrometer, more preferably in the range of from 1 to 50 micrometer, more preferably in the range of from 1.5 to 25 micrometer, more preferably in the range of from 1.8 to 10 micrometer, determined via particle size distribution measurement as described in Reference Example 2.

Preferably, the zeolitic material according to (ii) has a particle size distribution with a Dv50 value in the range of from 0.3 to 50 micrometer, more preferably in the range of from 0.4 to 15 micrometer, more preferably in the range of from 0.5 to 5 micrometer, determined via particle size distribution measurement as described in Reference Example 2.

Preferably, the zeolitic material according to (ii) has a particle size distribution with a Dv10 value in the range of from 0.1 to 10 micrometer, more preferably in the range of from 0.2 to 5 micrometer, more preferably in the range of from 0.3 to 2 micrometer, determined via particle size distribution measurement as described in Reference Example 2.

It is preferred that the zeolitic material according to (ii) is a zeolitic material having acidic properties after exposing to water. In the context of the present invention, a zeolitic material having acidic properties is to be understood as a zeolitic material, which when present in an aqueous suspension consisting of said zeolitic material and deionized water, preferably prepared according to Reference Example 9, lowers the pH of said suspension to a value below 6.4, preferably in the range of from 2 to 6.3, more preferably in the range of from 3 to 6.2, more preferably in the range of from 3.5 to 6.1, more preferably in the range of from 3.8 to 6, the pH being determined as defined in Reference Example 3.

Alternatively, it is preferred that the zeolitic material according to (ii) is a zeolitic material having acid buffer, neutral, or alkaline properties after exposing to water. In the context of the present invention, a zeolitic material having acid buffer, neutral, or alkaline properties is to be understood a zeolitic material, which when present in an aqueous suspension consisting of said zeolitic material and deionized water, preferably prepared according to Reference Example 9, slightly lowers or increases the pH of said suspension to a value above 6.4, preferably in the range of from 6.5 to 10, more preferably in the range of from 6.6 to 9, more preferably in the range of from 6.7 to 7.5, the pH being determined as defined in Reference Example 3. For example, in the context of the present invention, a zeolitic material having acid buffer properties is to be understood a zeolitic material, which when present in an aqueous suspension consisting of said zeolitic material and deionized water, preferably prepared according to Reference Example 9, can slightly lower the pH of said suspension to a value of 6.5. As a further example, in the context of the present invention, a zeolitic material having neutral properties is to be understood a zeolitic material, which when present in an aqueous suspension consisting of said zeolitic material and deionized water, preferably prepared according to Reference Example 9, can slightly increase the pH of said suspension to a value of 7.2. As a further example, in the context of the present invention, a zeolitic material having alkaline properties is to be understood a zeolitic material, which when present in an aqueous suspension consisting of said zeolitic material and deionized water, preferably prepared according to Reference Example 9, can increase the pH of said suspension to a value of 7.5.

Zeolitic materials are well known to the skilled person to possess Lewis acid sites, strong Brønsted acid sites and weak Brønsted acid sites. Accordingly, the skilled person also understands that the hydroxyl groups of the zeolite when sufficiently deprotonated can act as base as do the deprotonated weak acid sites when encountering acids. Thus, in the context of the present invention, it is to be understood that a zeolitic material having acid properties acts as a Brønsted acid that will release protons to an aqueous suspension, such that said suspension consisting of deionized water and the zeolitic material according to (ii), preferably prepared according to Reference Example 9, will have a pH value below 6.4, preferably in the range of from 2 to 6.3, more preferably in the range of from 3 to 6.2, more preferably in the range of from 3.5 to 6.1, more preferably in the range of from 3.8 to 6, the pH being determined as defined in Reference Example 3. Further, in the context of the present invention, it is to be understood that a zeolite having acid buffer properties or neutral properties acts as a Brønsted acid or conjugate base of said acid that will release or accept protons to or from an aqueous suspension, such that said suspension consisting of deionized water and the zeolitic material according to (ii), preferably prepared according to Reference Example 9, will have a pH value above 6.4 and below 7.3 when measured according to Reference Example 3. Likewise, in the context of the present invention, it is to be understood that a zeolite having alkaline properties acts as a base that will accept protons from an aqueous suspension such that said suspension consisting of deionized water and the zeolitic material according to (ii), preferably prepared according to Reference Example 9, will have a pH value above 7.3, the pH being determined as defined in Reference Example 3.

Further, in a zeolitic material, the available sites showing generally acidic or alkaline behavior are prone to reach an equilibrium state after dispersing in an aqueous environment. Therefore, more or less acidic behavior or even slight alkaline behavior can be observed depending on the alkaline content or more generally, the type of the zeolite.

The Zirconium Complex According to (iii)

Preferably, the bidentate organic ligand according to (iii) of the inventive suspension comprises, more preferably is, one or more of an alpha hydroxy acid, a beta hydroxy acid, a 2,4-diketone, and a 1,3-dicarbonyl compound, more preferably one more of a C2 to C6 alpha hydroxy acid, a C3 to C6 beta hydroxy acid, a C3 to C6 1,3-dicarbonyl compound, and a C5 to C9 2,4-diketone, more preferably one or more of a C2 to C5 alpha hydroxy acid, a C3 to C5 beta hydroxy acid, a C3 to C5 1,3-dicarbonyl compound, and a C5 to C8 2,4-diketone, more preferably one or more of a C3 to C4 alpha hydroxy acid, a C3 to C4 beta hydroxy acid, a C3 to C4 1,3-dicarbonyl compound, and a C5 to C6 2,4-diketone. It is further preferred that the bidentate organic ligand according to (iii) consists of the elements carbon, hydrogen and oxygen. Preferably, the bidentate organic ligand according to (iii) comprises, more preferably is, one or more of acetylacetone, glycolic acid, lactic acid, tartronic acid, ascorbic acid, glucuronic acid, tartaric acid and glucuronolactone, more preferably one or more of glycolic acid, lactic acid, tartronic acid, ascorbic acid, glucuronic acid and glucuronolactone, more preferably one or more of glycolic acid, lactic acid, ascorbic acid and glucuronic acid, more preferably one or more of glycolic acid and lactic acid. More preferably, the bidentate organic ligand according to (iii) comprises, more preferably is lactic acid.

It is more preferred that, when the zeolitic material according to (ii) is a zeolitic material having acidic properties, the bidentate organic ligand according to (iii) comprises, more preferably is, one or more of acetylacetone, glycolic acid, lactic acid, tartronic acid, ascorbic acid, glucuronic acid, tartaric acid and glucuronolactone, more preferably one or more of glycolic acid, lactic acid, tartronic acid, ascorbic acid, glucuronic acid and glucuronolactone, more preferably one or more of glycolic acid, lactic acid, ascorbic acid and glucuronic acid, more preferably one or more of glycolic acid and lactic acid, more preferably lactic acid It is more preferred that, when the zeolitic material according to (ii) is a zeolitic material having acid buffer, neutral, or alkaline properties, the bidentate organic ligand according to (iii) comprises, more preferably is, one or more of acetylacetone, glycolic acid, lactic acid, tartronic acid, ascorbic acid, glucuronic acid, tartaric acid and glucuronolactone, more preferably one or more of glycolic acid, lactic acid, tartronic acid, ascorbic acid, glucuronic acid and glucuronolactone, more preferably one or more of glycolic acid, lactic acid, ascorbic acid and glucuronic acid, more preferably one or more of glycolic acid and lactic acid, more preferably lactic acid.

Preferably, the bidentate organic ligand according to (iii) has a solubility in water, measured at a temperature of the water of 20° C., of at least 20 g of said ligand to 100 mL of water, more preferably of at least 25 g of said ligand to 100 mL of water, more preferably of at least 30 g of said ligand to 100 mL of water.

Further Characteristics of the Suspension

Preferably, the weight ratio of the water employed according to (i) relative to the total weight of the framework Si, Al and O of the zeolitic material employed according to (ii), weight (water):weight (total sum of framework Si, Al and O of the zeolitic material), is in the range of from 80:20 to 40:60, preferably in the range of from 75:25 to 45:55, preferably in the range of from 70:30 to 48:52, more preferably in the range of from 60:40 to 50:50.

Preferably, the weight ratio of the zirconium ion comprised in the complex according to (iii), calculated as zirconium oxide, relative to the total weight of the framework Si, Al and O of the zeolitic material according to (ii), weight (zirconium oxide):weight (total sum of framework Si, Al and O of the zeolitic material), is in the range of from 0.02:1 to 0.1:1, preferably in the range of from 0.03:1 to 0.08:1, more preferably in the range of from 0.04:1 to 0.06:1.

Preferably, according to (iii), the weight ratio of the bidentate organic ligand relative to the zirconium ion is in the range of from 0.01 to 2.0, more preferably in the range of from 0.05 to 1.0, more preferably in the range of from 0.1 to 0.9, more preferably in the range of from 0.15 to 0.8, more preferably in the range of from 0.175 to 0.75, more preferably in the range of from 0.2 to 0.7.

Preferably, the amount of zirconium oxychloride comprised in the suspension, is in the range of from 0 to 3 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension.

Preferably, the amount of one or more fluoride, chloride, bromide and iodide, more preferably one or more of fluoride, chloride and bromide, more preferably one or more of chloride and bromide, more preferably chloride, comprised in the suspension is in the range of from 0 to 3 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension.

Preferably, the amount of zirconium sulfate or sulfate anion comprised in the suspension is in the range of from 0 to 3 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension.

Preferably, the amount of one or more alkali metals Li, Na, K and Cs comprised in the suspension, more preferably one or more alkali metals Li, Na and K, more preferably one or more alkali metals Na and K, more preferably the alkali metal Na, is in the range of from 0 to 10 weight-%, more preferably in the range of from 0 to 5 weight-%, more preferably in the range of from 0 to 3 weight-%, more preferably in the range of from 0 to 2 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, based on the total weight of the alkali metals present and the total weight of the suspension.

The pH and Viscosity of the Suspension

Preferably, the liquid phase of the suspension has a pH in the range of from 0 to 12, more preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5, more preferably in the range of from 3.7 to 5.5, wherein the pH is determined as described in Reference Example 3.

Preferably, the aqueous suspension when measured at 100 $s^{-1}$ has a viscosity in the range of from 2 mPas to 1000 mPas, more preferably in the range of from 5 mPas to 800 mPas determined as described in Reference Example 4.

Optional Refractory Metal Oxide

It is preferred that the aqueous suspension in addition to the components according to (i), (ii) and (iii) comprises:

(iv) one or more of a refractory metal oxide and a precursor of a refractory metal oxide.

Preferably, the one or more of a refractory metal oxide and a precursor of a refractory metal oxide comprises, more preferably is, one or more of an alumina, a silica, a titania, an aluminum hydroxide, an aluminum oxyhydroxide, an aluminum salt, a colloidal alumina, a silicon alcoholate, a colloidal silica, a fumed silica, a water glass, a titanium alcoholate, and a colloidal titanic; more preferably one or more of an alumina, a silica, an aluminum hydroxide, an aluminum oxyhydroxide, an aluminum salt, a colloidal alumina, a silicon alcoholate, a colloidal silica, a fumed silica, and a water glass; more preferably one or more of an alumina, a silica, an aluminum hydroxide, an aluminum oxyhydroxide, an aluminum salt, and a colloidal alumina; more preferably one or more of an alumina and a silica, more preferably alumina.

Preferably, the weight ratio of the one or more of a refractory metal oxide and a precursor of a refractory metal oxide according to (iv) relative to the total weight of the framework Si, Al and O of the zeolitic material, weight (iv):weight (total sum of framework Si, Al and O of the zeolitic material), is in the range of from 0.01:1 to 0.13:1, more preferably in the range of from 0.03:1 to 0.11:1, more preferably in the range of from 0.05:1 to 0.09:1.

Optional Base, Additives and the Corresponding Physical Properties

Optionally, the aqueous suspension further comprises in addition to the components according to (i), (ii), (iii) and optionally (iv):

(v) an organic base.

If an organic base is present, the organic base according to (v) is preferably one or more of ammonia and a C1 to C6 amine, more preferably one or more of ammonia and a C1 to C5 amine, more preferably one or more of ammonia and a C1 to C4 amine, more preferably one or more of ammonia and a C1 to C3 amine, more preferably one or more of ammonia and a C1 to C2 amine, more preferably one or more of triethanolamine, diethanolamine, ethanolamine and ammonia, the organic base more preferably comprising, more preferably being ethanolamine.

If an organic base is present, the weight ratio of the organic base according to (v) relative to the total weight of the framework Si, Al and O of the zeolitic material according to (ii), weight (organic base):weight (total sum of framework Si, Al and O of the zeolitic material), is preferably in the range of from 0.01:1 to 0.5:1, more preferably in the range of from 0.01:1 to 0.1:1, more preferably in the range of from 0.02:1 to 0.05:1.

If an organic base is present, the aqueous suspension preferably has a pH in the range of from 0 to 12, more preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5.5, wherein the pH is determined as described in Reference Example 3.

If an organic base is present, the aqueous suspension preferably has a viscosity measured at 100 s$^{-1}$ in the range of from 2 mPas to 1000 mPas, more preferably in the range of from 5 mPas to 800 mPas, determined as described in Reference Example 4.

Preferably, the suspension has storage stability in the range of from 1 d (day) to 120 d, preferably in the range of from 1 d to 60 d, more preferably in the range of from 1 d to 30 d, determined as described in Reference Example 5.

It may be preferred that the inventive suspension further comprises one or more adhesion promotors, more preferably one or more of a polyacetylene, a polycarboxylate and a polyethylene glycol.

It may be preferred that the inventive suspension further comprises one or more dispersing agents, more preferably one or more of a poly(carboxylate ether), a poly(aryl ether), a poly(acrylic acid) and a polyethylene glycol.

It may be preferred that the inventive suspension further comprises one or more rheology modifiers, more preferably one or more of a cellulose ether, a carboxy methyl cellulose, a hydroxy ethyl cellulose, a hydroxy ethyl methyl cellulose and an optionally hydrophobically modified polyurethane thickener.

Process for Preparing an Aqueous Suspension

The present invention relates a process for preparing an aqueous suspension, preferably the aqueous suspension as described hereinabove, the process comprising:

(a) mixing water and a zirconium salt;

(b) adding a bidentate organic ligand to the mixture obtained from (a), obtaining an aqueous solution comprising a chelate complex comprising a zirconium ion and the bidentate organic ligand bonded to said zirconium ion via zirconium oxygen bonds from two oxygen atoms comprised in said ligand;

(c) adding a zeolitic material and one or more of copper and iron to the aqueous solution obtained from (b), obtaining an aqueous suspension, wherein the one or more of copper and iron is either comprised in the zeolitic material, or in a source of one or more of copper and iron, or in the zeolitic material and in a source of one or more of copper and iron.

Step (a)

It is preferred that the water according to (a) is deionized water. Preferably, the water has a conductivity in the range of from 50 to 4000 microSiemens/cm, more preferably in the range of from 100 to 3000 microSiemens/cm, more preferably in the range of from 150 to 200 microSiemens/cm, determined as described in Reference Example 6.

Preferably, the mixing according to (a) is carried out at a temperature of the water in the range of from 4 to 40° C., more preferably in the range of from 10 to 30° C., more preferably in the range of from 12 to 25° C.

Preferably according to (a), the zirconium salt is one or more of a zirconium carboxylate, a zirconium alcoholate, and a zirconium nitrate, more preferably one or more of a zirconium carboxylate and a zirconium nitrate. It is preferred that in the process according to (a), the zirconium salt is a zirconium carboxylate which comprises, more preferably is, one or more of a C1 to C7 carboxylate, more preferably one or more of a zirconium C1 to C6 carboxylate, more preferably one or more of a zirconium C1 to C5 carboxylate, more preferably one or more of a zirconium C1 to C4 carboxylate, more preferably one or more of a zirconium C1 to C3 carboxylate, more preferably one or more of a zirconium C1 to C2 carboxylate. More preferably, the zirconium salt comprises, more preferably is zirconium acetate.

Preferably according to (a), the mixing is conducted for a duration in the range of from 1 to 30 min, more preferably in the range of from 2 to 25 min, more preferably in the range of from 5 to 20 min, more preferably in the range of from 8 to 15 min, more preferably in the range of from 9 to 14 min, more preferably in the range of from 10 to 12 min.

Step (b)

Preferably, the bidentate organic ligand according to (b) of the inventive process comprises, preferably is, one or more of an alpha hydroxy acid, a beta hydroxy acid, a 2,4-diketone, and a 1,3-dicarbonyl compound, preferably one or more of a C2 to C6 alpha hydroxy acid, a C3 to C6 beta hydroxy acid, a C3 to C6 1,3-dicarbonyl compound, and a C5 to C9 2,4-diketone, more preferably one or more of a C2 to C5 alpha hydroxy acid, a C3 to C5 beta hydroxy acid, a C3 to C5 1,3-dicarbonyl compound, and a C5 to C8 2,4-diketone, more preferably one or more of a C3 to C4 alpha hydroxy acid, a C3 to C4 beta hydroxy acid, a C3 to C4 1,3-dicarbonyl compound, and a C5 to C6 2,4-diketone. Preferably, the bidentate organic ligand according to (b) consists of the elements carbon, hydrogen and oxygen. More preferably, the bidentate organic ligand according to (b) comprises, preferably is, one or more of acetylacetone, glycolic acid, lactic acid, tartronic acid, ascorbic acid, glucuronic acid, and glucuronolactone, preferably one or more of glycolic acid, lactic acid, tartronic acid, ascorbic acid, glucuronic acid, and glucuronolactone, more preferably one or more of glycolic acid, lactic acid, ascorbic acid, and glucuronic acid, more preferably one or more of glycolic acid and lactic acid, wherein more preferably, the bidentate organic ligand according to (b) comprises, more preferably is lactic acid.

Preferably according to (b), the addition of the bidentate organic ligand is carried out at a temperature of the mixture obtained in (a) at a temperature of the water in the range of from 4 to 40° C., preferably in the range of from 10 to 30° C., more preferably in the range of from 12 to 25° C.

Preferably according to (b), the bidentate organic ligand is added with mixing conducted for a duration in the range of from 1 to 30 min, preferably in the range of from 2 to 25 min, more preferably in the range of from 5 to 20 min, more preferably in the range of from 8 to 15 min, more preferably in the range of from 9 to 14 min, more preferably in the range of from 10 to 12 min.

Step (c)

Preferably, the zeolitic material added according to (c) has framework type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF,*-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, or a mixed type of two or more thereof, preferably AEI, GME, CHA, MFI, BEA, FAU, MOR, a mixture of two or more thereof or a mixed type of two or more thereof, more preferably AEI, GME, CHA, FAU, MOR, a mixture of two or more thereof or a mixed type of two or more thereof, more preferably AEI, CHA, BEA, a mixture of two or more thereof or a mixed type of two or more thereof, more preferably CHA or AEI. Even more preferably according to (c) of the inventive process, the zeolitic material has framework type CHA.

Preferably, the molar ratio of Si to Al of the framework structure of the zeolitic material according to (c), calculated as $SiO_2:Al_2O_3$, is in the range of from 2:1 to 50:1, preferably in the range of from 5:1 to 50:1, more preferably in the range of from 10:1 to 45:1, more preferably in the range of from 11:1 to 40:1, more preferably in the range of from 12:1 to 38:1, more preferably in the range of from 13:1 to 35:1.

Preferably, from 95 to 100 weight-%, preferably from 98 to 100 weight-%, more preferably from 99 to 100 weight-% of the framework structure of the zeolitic material according to (c) consists of Si, Al, O, optionally one or more of Cu and Fe, and optionally one or more of H and P.

Preferably, according to (c), a zeolitic material is added which comprises copper, or a zeolitic material and a source of copper are added, or a zeolitic material comprising copper and a source of copper are added.

According to a first embodiment of the present invention, it is preferred that the zeolitic material added according to (c) comprises copper. More preferably, the zeolitic material added according to (c) comprises copper in an amount, calculated as CuO, in the range of 1 to 10 weight-%, preferably in the range of from 1.5 to 8 weight-%, preferably in the range of from 1.8 to 6 weight-%, preferably in the range of from 2 to 5.5 weight-%, preferably in the range of from 2 to 5 weight-%, more preferably in the range of from greater than 2 to less than 5 weight-%, preferably in the range of from 2.1 to 4.9 weight-%, preferably in the range of from 2.2 to 4.8 weight-%, based on the total weight of the framework Si, Al and O of the zeolitic material.

According to this first embodiment of the present invention, it is preferred that according to (c), no source of copper is added in addition to the zeolitic material comprising copper. Preferably, the amount of copper comprised in the zeolitic material according to (c), calculated as CuO, is in the range of from 0.1 to 3 weight-%, preferably in the range of from 0.2 to 2 weight-%, more preferably in the range of from 0.5 to 1.75 weight-%, based on the total weight of the framework Si, Al and O of the zeolitic material.

Further according to this first embodiment, it is also preferred that in addition to the zeolitic material, a source of copper is added according to (c). The source of copper is preferably selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO. Preferably, the copper source, calculated as CuO, is added according to (c) in an amount in the range of from 1 to 10 weight-%, preferably in the range of from 1.5 to 5 weight-%, more preferably in the range of from 1.5 to 4 weight-%, based on the total weight of the framework Si, Al and O of the zeolitic material added according to (c).

According to a second embodiment of the present invention, it may be preferred that the amount of copper comprised in the zeolitic material added according to (c), calculated as CuO, is in the range of from 0 to less than 0.1 weight-%, preferably in the range of from 0 to 0.01 weight-%, more preferably in the range of from 0 to 0.001 weight-%, based on the total weight of the framework Si, Al and O of the zeolitic material, wherein more preferably, the zeolitic material added according to (c) is free of copper, and wherein in addition to the zeolitic material, a source of copper is added according to (c), wherein the source of copper is preferably selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO. In this case, the source of copper, calculated as CuO, is preferably added according to (c) in an amount in the range of from 1 to 13 weight-%, more preferably in the range of from 1.5 to 8 weight-%, more preferably in the range of from 2 to 6 weight-%, based on the total weight of the framework Si, Al and O of the zeolitic material added according to (c).

It is further preferred that the zeolitic material added according to (c) is substantially free from platinum group metals and noble metals. Noble metals are defined as one or more of Ru, Re, Rh, Pd, Ag, Os, Ir, Pt and Au. Platinum group metals are defined as one or more of Ru, Rh, Pd, Ir and Pt. More specifically, it is further preferred that the zeolitic material according to (c) is substantially free from Pd, Pt and Rh. It is clear to one skilled in the art that some traces of platinum group and noble group metals as well as other transition metals may be present but in amounts that do not affect catalysis such that substantially free is defined as less than 2% by weight, more preferably less than 1% by weight, more preferably less than 500 ppm by weight, more preferably less than 100 ppm by weight, calculated on the basis of the total amount of transition metals by weight present in the zeolitic material according to (c) or to all components present in the aqueous suspension based on the mass of the zeolitic material present in the suspension according to (c) or (d).

Preferably, the amount of iron comprised in the zeolitic material according to (c), calculated as $Fe_2O_3$, is in the range of from 0 to 0.01 weight-%, preferably in the range of from 0 to 0.001 weight-%, more preferably in the range of from 0 to 0.0001 weight-%, based on the total weight of the framework Si, Al and O of the zeolitic material.

Preferably, from 95 to 100 weight-%, preferably from 98 to 100 weight-%, more preferably from 99 to 100 weight-%, more preferably from 99.5 to 100 weight-%, more preferably from 99.9 to 100 weight-% of the zeolitic material according to (c) consist of Si, Al, O, Cu, and optionally one or more of H and P.

According to a further aspect of the present invention, it may be preferred that the zeolitic material added according to (c) comprises iron wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the framework Si, Al and O of the zeolitic material, and wherein preferably from 95 to 100 weight-%, more preferably from 98 to 100 weight-%, more preferably from 99 to 100 weight-% of the framework structure of the zeolitic material consists to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 5:1 to 48:1, more preferably in the range of from 10:1 to 45:1, more preferably in the range of from 11:1 to 40:1, more preferably in the range of from 12:1 to 38:1, more preferably in the range of from 13:1 to 35:1.

Preferably, the mean crystallite size of the zeolitic material according to (c) is at least 50 nanometer, preferably in the range of from 50 to 250 nanometer, more preferably in the range of from 70 to 200 nanometer, as determined by X-ray diffraction described in Reference Example 1.

Preferably, the zeolitic material according to (c) has a particle size distribution with a Dv90 value in the range of from 1 to 100 micrometer, preferably in the range of from 1.5 to 50 micrometer, more preferably in the range of from 2 to 25 micrometer, determined via particle size distribution measurement as described in Reference Example 2.

Preferably, the zeolitic material according to (c) has a particle size distribution with a Dv50 value in the range of from 0.3 to 50 micrometer, preferably in the range of from 0.4 to 15.0 micrometer, more preferably in the range of from 0.5 to 10 micrometer, determined via particle size distribution measurement as described in Reference Example 2.

Preferably, the zeolitic material according to (c) has a particle size distribution with a Dv10 value in the range of from 0.1 to 10 micrometer, preferably in the range of from 0.4 to 5.0 micrometer, more preferably in the range of from 0.5 to 3 micrometer, determined via particle size distribution measurement as described in Reference Example 2.

It is preferred that the zeolitic material according to (c) is a zeolitic material having acidic properties after exposing to water. In the context of the present invention, a zeolitic material having acidic properties is to be understood as a zeolitic material, which when present in an aqueous suspension consisting of said zeolitic material and deionized water, preferably prepared according to Reference Example 9, lowers the pH of said suspension to a value below 6.4, preferably in the range of from 2 to 6.3, more preferably in the range of from 3 to 6.2, more preferably in the range of from 3.5 to 6.1, more preferably in the range of from 3.8 to 6, the pH being determined as defined in Reference Example 3.

Alternatively, it is preferred that the zeolitic material according to (c) is a zeolitic material having acid buffer, neutral, or alkaline properties after exposing to water. In the context of the present invention, a zeolitic material having acid buffer, neutral, or alkaline properties is to be understood as a zeolitic material, which when present in an aqueous suspension consisting of said zeolitic material and deionized water, preferably prepared according to Reference Example 9, slightly lowers or increases the pH of said suspension to a value above 6.4, preferably in the range of from 6.5 to 10, more preferably in the range of from 6.6 to 9, more preferably in the range of from 6.7 to 7.5, the pH being determined as defined in Reference Example 3. For example, in the context of the present invention, a zeolitic material having acid buffer properties is to be understood a zeolitic material, which when present in an aqueous suspension consisting of said zeolitic material and deionized water, preferably prepared according to Reference Example 9, can slightly lower the pH of said suspension to a value of 6.5. As a further example, in the context of the present invention, a zeolitic material having neutral properties is to be understood a zeolitic material, which when present in an aqueous suspension consisting of said zeolitic material and deionized water, preferably prepared according to Reference Example 9, can slightly increase the pH of said suspension to a value of 7.2. As a further example, in the context of the present invention, a zeolitic material having alkaline properties is to be understood a zeolitic material, which when present in an aqueous suspension consisting of said zeolitic material and deionized water, preferably prepared according to Reference Example 9, can increase the pH of said suspension to a value of 7.5.

Zeolitic materials are well known to the skilled person to possess Lewis acid sites, strong Brønsted acid sites and weak Brønsted acid sites. Accordingly, the skilled person also understands that the hydroxyl groups of the zeolite when sufficiently deprotonated can act as base as do the deprotonated weak acid sites when encountering acids. Thus, in the context of the present invention, it is to be understood that a zeolitic material having acid properties acts as a Brønsted acid that will release protons to an aqueous suspension, such that said suspension consisting of deionized water and the zeolitic material according to (c), preferably prepared according to Reference Example 9, will have a pH value below 6.4, preferably in the range of from 2 to 6.3, more preferably in the range of from 3 to 6.2, more preferably in the range of from 3.5 to 6.1, more preferably in the range of from 3.8 to 6, the pH being determined as defined in Reference Example 3. Further, in the context of the present invention, it is to be understood that a zeolite having acid buffer properties or neutral pH properties acts as a Brønsted acid or conjugate base of said acid that will release or accept protons to or from an aqueous suspension, such that said suspension consisting of deionized water and the zeolitic material according to (c), preferably prepared according to Reference Example 9, will have a pH value above 6.4 and below 7.3 when measured according to Reference Example 3. Likewise, in the context of the present invention, it is to be understood that a zeolite having alkaline properties acts as a base that will accept protons from an aqueous suspension such that said suspension consisting of deionized water and the zeolitic material according to (c), preferably prepared according to Reference Example 9, will have a pH value above 7.3, the pH being determined as defined in Reference Example 3.

Further, in a zeolitic material, the available sites showing generally acidic or alkaline behavior are prone to reach an equilibrium state after dispersing in an aqueous environment. Therefore, more or less acidic behavior or even slight alkaline behavior can be observed depending on the alkaline content or more generally, the type of the zeolite.

It is more preferred that, when the zeolitic material according to (c) is a zeolitic material having acidic properties, the bidentate organic ligand according to (b) comprises, more preferably is, one or more of acetylacetone, glycolic acid, lactic acid, tartronic acid, ascorbic acid, glucuronic acid, tartaric acid and glucuronolactone, more preferably one or more of glycolic acid, lactic acid, tartronic acid, ascorbic acid, glucuronic acid and glucuronolactone, more preferably one or more of glycolic acid, lactic acid, ascorbic acid and glucuronic acid, more preferably one or more of glycolic acid and lactic acid, more preferably lactic acid It is more preferred that, when the zeolitic material according to (c) is a zeolitic material having acid buffer, neutral or alkaline properties, the bidentate organic ligand according to (b) comprises, more preferably is, one or more of acetylacetone, glycolic acid, lactic acid, tartronic acid, ascorbic acid, glucuronic acid, tartaric acid and glucuronolactone, more preferably one or more of glycolic acid, lactic acid, tartronic acid, ascorbic acid, glucuronic acid and glucuronolactone, more preferably one or more of glycolic acid, lactic acid, ascorbic acid and glucuronic acid, more preferably one or more of glycolic acid and lactic acid, more preferably lactic acid.

Preferably, adding the zeolitic material according to (c) comprises dispersing the zeolitic material in the aqueous solution obtained from (b). Preferably according to (c), the zeolitic material is dispersed in the aqueous solution at a rate in the range of from 1 to 1200 g/s, more preferably in the range of from 10 to 1000 g/s, more preferably in the range of from 100 to 900 g/s, more preferably in the range of from 200 to 800 g/s. Preferably, according to (c) the zeolitic material is dispersed in the aqueous solution at a temperature of the water in the range of from 4 to 40° C., more preferably in the range of from 10 to 30° C., more preferably in the range of from 12 to 25° C. Preferably, according to (c) the zeolitic material is dispersed in the aqueous solution for a duration in the range of from 1 to 30 min, preferably in the range of from 2 to 25 min, more preferably in the range of from 5 to 20 min, more preferably in the range of from 8 to 15 min, more preferably in the range of from 9 to 14 min, more preferably in the range of from 10 to 12 min.

Further Process Features

Preferably, the liquid phase obtained from (c) has a pH in the range of from 0 to 12, more preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5, more preferably in the range of from 3.7 to 5.5, wherein the pH is determined as described in Reference Example 3.

Preferably, the weight ratio of the water employed according to (a) relative to the total weight of the framework Si, Al and O of the zeolitic material employed according to (c), weight (water):weight (total sum of framework Si, Al and O of the zeolitic material), is in the range of from 80:20 to 40:60, more preferably in the range of from 75:25 to 45:55, preferably in the range of from 70:30 to 48:52, more preferably in the range of from 60:40 to 50:50.

Preferably, the weight ratio of the zirconium salt employed according to (a), calculated as zirconium (IV) oxide, relative to the total weight of the framework Si, Al and O of the zeolitic material employed according to (c), weight (zirconium):weight (total sum of framework Si, Al and O of the zeolitic material), is in the range of from 0.02:1 to 0.1:1, more preferably in the range of from 0.03:1 to 0.08:1, more preferably in the range of from 0.04:1 to 0.06:1.

Preferably, the weight ratio of the bidentate organic ligand employed according to (b) relative to the zirconium salt employed according to (a), is in the range of from 0.01 to 2.0, more preferably in the range of from 0.05 to 1.0, more preferably in the range of from 0.1 to 0.9, more preferably in the range of from 0.15 to 0.8, more preferably in the range of from 0.175 to 0.75, more preferably in the range of from 0.2 to 0.7.

Preferably, the viscosity of the suspension obtained from (c) measured at 100 s$^{-1}$ is in the range of from 2 mPas to 1000 mPas, more preferably in the range of from 5 mPas to 800 mPas determined as described in Reference Example 4.

Optional Addition of a Refractory Metal Oxide Process Step

It is preferred that the inventive process further comprises:

(d) adding one or more of a refractory metal oxide and a precursor of a refractory metal oxide to the aqueous solution obtained from (b) or to the suspension obtained from (c).

Preferably, the one or more of a refractory metal oxide and a precursor of a refractory metal oxide comprises, more preferably is, one or more of an alumina, a silica, a titania, an aluminum hydroxide, an aluminum oxyhydroxide, an aluminum salt, a colloidal alumina, a silicon alcoholate, a colloidal silica, a fumed silica, a water glass, a titanium alcoholate, and a colloidal titania; more preferably one or more of an alumina, a silica, an aluminum hydroxide, an aluminum oxyhydroxide, an aluminum salt, a colloidal alumina, a silicon alcoholate, a colloidal silica, a fumed silica, and a water glass; more preferably one or more of an alumina, a silica, an aluminum hydroxide, an aluminum oxyhydroxide, an aluminum salt, and a colloidal alumina; more preferably one or more of an alumina and a silica, more preferably alumina.

Preferably, the weight ratio of the one or more of a refractory metal oxide and a precursor of a refractory metal oxide employed according to (d) relative to the total weight of the framework Si, Al and O of the zeolitic material employed according to (c), weight (d):weight (total sum of framework Si, Al and O of the zeolitic material), is in the range of from 0.01:1 to 0.13:1, more preferably in the range of from 0.03:1 to 0.11:1, more preferably in the range of from 0.05:1 to 0.09:1.

Optional Addition of a Base

It may be preferred that the inventive process further comprises adding an organic base to the aqueous solution obtained before (c) and/or to the suspension obtained after (c). Preferably, the organic base is one or more of ammonia and a C1 to C6 amine, more preferably one or more of ammonia and a C1 to C5 amine, more preferably one or more of ammonia and a C1 to C4 amine, more preferably one or more of ammonia and a C1 to C3 amine, more preferably one or more of ammonia and a C1 to C2 amine, more preferably one or more of ethanolamine, ethanolamine, ethanolamine and ammonia, the organic base more preferably comprising, more preferably being ethanolamine.

If the base is added, the pH of the aqueous solution obtained before (c) or the liquid phase of the suspension obtained from (c) is preferably in the range of from 0 to 12, more preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5.5, wherein the pH is determined as described in Reference Example 3.

If the base is added, the suspension obtained from (c) or (d) has a viscosity measured at 100 $s^{-1}$ preferably in the range of from 2 mPas to 1000 mPas, more preferably in the range of from 5 mPas to 800 mPas, determined as described in Reference Example 4.

It may be preferred that the inventive process further comprises adding one or more adhesion promotors to the solution obtained from (b) or the suspension obtained from (c), wherein the one or more adhesion promoters preferably comprises, more preferably is, one or more of a polyacetylene, a polycarboxylate and a polyethylene glycol.

It may be be preferred that the inventive process further comprises adding one or more dispersing agents to the solution obtained from (b) or the suspension obtained from (c), wherein the one or more dispersing agents preferably comprises, more preferably is one or more of a poly(carboxylate ether), a poly(aryl ether), a poly(acrylic acid) and a polyethylene glycol.

It may be preferred that the inventive process further comprises adding one or more rheology modifiers to the solution obtained from (b) or the suspension obtained from (c), wherein the one or more rheology modifiers preferably comprises, more preferably is one or more of a cellulose ether, a carboxy methyl cellulose, a hydroxy ethyl cellulose, a hydroxy ethyl methyl cellulose and an optionally hydrophobically modified polyurethanes thickener.

Further Process Features

Preferably, during the entire inventive process, the amount of zirconium oxychloride, more preferably the amount of zirconium halide added is in the range of from 0 to 3 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension obtained from (c) or (d).

It is further preferred that the solution before (c) or the suspension obtained from (c) of the inventive process comprises an amount of one or more fluoride, chloride, bromide and iodide, more preferably one or more of fluoride, chloride and bromide, more preferably one or more of chloride and bromide, more preferably chloride, in the range of from 0 to 3 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the weight of the anion and the total weight of the suspension obtained from (c) or (d).

Preferably, the solution before (c) or the suspension from (c) of the inventive process comprises an amount of zirconium sulfate or sulfate anion in the range of from 0 to 3 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm based on the weight of the zirconium sulfate or sulfate anion and total weight of the suspension obtained from (c) or (d).

Preferably, the solution before (c) comprises one or more alkali metals Li, Na, K and Cs, more preferably one or more alkali metals Li, Na and K, more preferably one or more alkali metals Na and K, more preferably the alkali metal Na, in an amount in the range of from 0 to 10 weight-%, preferably in the range of from 0 to 5 weight-%, more preferably in the range of from 0 to 3 weight-%, more preferably in the range of from 0 to 2 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the solution.

Preferably, the aqueous suspension obtained from (c) comprises one or more alkali metals Li, Na, K and Cs, more preferably one or more alkali metals Li, Na and K, more preferably one or more alkali metals Na and K, more preferably the alkali metal Na in an amount in the range of from 0 to 10 weight-%, more preferably in the range of from 0 to 5 weight-%, more preferably in the range of from 0 to 3 weight-%, more preferably in the range of from 0 to 2 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the sum total of mass from the alkali metals present in the total weight of the suspension.

Further Aspects of the Invention

The invention further relates to an aqueous suspension which is obtained or obtainable by the inventive process as described hereinabove.

The invention also relates to a use of the inventive suspension for preparing a selective catalytic reduction catalyst, preferably for the treatment of the exhaust gas stream of a diesel engine.

It is preferred that the inventive aqueous suspension is used as a washcoat or as an intermediate for producing a washcoat, wherein said washcoat is preferably coated onto a substrate, preferably a flow-through substrate or a wall-flow substrate. It is also preferred that the inventive aqueous suspension is used as a washcoat or as an intermediate for producing a washcoat on a substrate comprising a ceramic or metallic substance. It is further preferred that the inventive aqueous suspension is used as a washcoat or as an intermediate for producing a washcoat on a substrate comprising, more preferably consisting of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite. It is also preferred that the inventive aqueous suspension is used as a washcoat or as an intermediate for producing a washcoat on a substrate comprising, more preferably consisting of a metallic substance, wherein the metallic substance preferably comprises, more preferably consists of, oxygen and one or more of iron, chromium, and aluminum.

The invention also relates to a process for preparing a selective catalytic reduction catalyst, preferably for the treatment of the exhaust gas stream of a diesel engine, said process comprising applying a washcoat onto an optionally pretreated substrate, preferably a flow-through substrate or a filter substrate, wherein the washcoat comprises or consists of the aqueous suspension according to the inventive suspension or obtained by or obtainable by the inventive process. Preferably, the process for preparing a selective catalytic reduction catalyst comprises a substrate comprising, preferably is, a ceramic or metallic substance. It is further preferred that the process for preparing a selective catalytic reduction catalyst comprises a substrate comprising, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite. It is preferred that the process for preparing a selective catalytic reduction catalyst comprises a substrate comprising, preferably consisting of a metallic substance, wherein the metallic substance preferably comprises, more preferably consists of, oxygen and one or more of iron, chromium, and aluminum.

The present invention is further illustrated by the following embodiments and combinations of embodiments as indicated by the respective dependencies and back-references. In particular, it is noted that in each instance where a range of embodiments is mentioned, for example in the context of a term such as "The suspension of any one of embodiments 1 to 4", every embodiment in this range is meant to be explicitly disclosed for the skilled person, i.e. the wording of this term is to be understood by the skilled person as being synonymous to "The suspension of any one of embodiments 1, 2, 3, and 4".

1. An aqueous suspension comprising
   (i) water;
   (ii) a zeolitic material and one or more of copper and iron, wherein the one or more of copper and iron is either comprised in the zeolitic material, or in a source of one or more of copper and iron, or in the zeolitic material and in a source of one or more of copper and iron;
   (iii) a chelate complex comprising a zirconium ion and a bidentate organic ligand bonded to said zirconium ion via zirconium oxygen bonds from two oxygen atoms comprised in said ligand, said chelate complex being dissolved in the water.

2. The suspension of embodiment 1, wherein the water according to (i) is deionized water.

3. The suspension of embodiment 1 or 2, wherein the water according to (i) has a conductivity in the range of from 50 to 4000 microSiemens/cm, preferably in the range of from 100 to 3000 microSiemens/cm, more preferably in the range of from 150 to 200 microSiemens/cm, determined as described in Reference Example 6.

4. The suspension of any one of embodiments 1 to 3, wherein the zeolitic material according to (ii) has framework type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF,*-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, or a mixed type of two or more thereof, preferably AEI, GME, CHA, MFI, BEA, FAU, MOR, a mixture of two or more thereof or a mixed type of two or more thereof, more preferably AEI, GME, CHA, FAU, MOR, a mixture of two or more thereof or a mixed type of two or more thereof, more preferably AEI, CHA, BEA, a mixture of two or more thereof or a mixed type of two or more thereof, more preferably CHA or AEI.

5. The suspension of any one of embodiments 1 to 4, wherein the zeolitic material according to (ii) has framework type CHA.

6. The suspension of any one of embodiments 1 to 5, wherein from 95 to 100 weight-%, preferably from 98 to 100 weight-%, more preferably from 99 to 100 weight-% of the framework structure of the zeolitic material according to (ii) consist of Si, Al, O, optionally one or more of Cu and Fe, and optionally one or more of H and P.
7. The suspension of any one of embodiments 1 to 6, wherein in the framework structure of the zeolitic material according to (ii), the molar ratio of Si to Al, calculated as $SiO_2:Al_2O_3$, is in the range of from 2:1 to 50:1, preferably in the range of from 5:1 to 48:1, more preferably in the range of from 10:1 to 45:1, more preferably in the range of from 11:1 to 40:1, more preferably in the range of from 12:1 to 38:1, more preferably in the range of from 13:1 to 35:1.
8. The suspension of any one of embodiments 1 to 7, wherein according to (ii), the suspension comprises a zeolitic material and copper, wherein the copper is either comprised in the zeolitic material, or in a source of copper, or in the zeolitic material and in a source of copper.
9. The suspension of any one of embodiments 1 to 8, wherein the zeolitic material according to (ii) comprises copper.
10. The suspension of embodiment 9, wherein the amount of copper comprised in the zeolitic material according to (ii), calculated as CuO, is in the range of 1 to 10 weight-%, preferably in the range of from 1.5 to 8 weight-%, preferably in the range of from 1.8 to 6 weight-%, more preferably in the range of from 1.9 to 5.5 weight-%, more preferably in the range of from 2 to 5 weight-%, based on the total weight of the framework Si, Al and O of the zeolitic material.
11. The suspension of embodiment 9 or 10, which, in addition to the zeolitic material comprising copper, does not comprise a source of copper.
12. The suspension of embodiment 9, wherein the amount of copper comprised in the zeolitic material according to (ii), calculated as CuO, is in the range of from 0.1 to 3 weight-%, preferably in the range of from 0.2 to 2 weight-%, more preferably in the range of from 0.5 to 1.75 weight-%, based on the total weight of the framework Si, Al and O of the zeolitic material.
13. The suspension of embodiment 12, in addition to the zeolitic material comprising a source of copper, preferably selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO.
14. The suspension of embodiment 13, comprising the source of copper, calculated as CuO, in an amount in the range of from 1 to 10 weight-%, preferably in the range of from 1.5 to 5 weight-%, more preferably in the range of from 1.5 to 4 weight-%, based on the total weight of the framework Si, Al and O of the zeolitic material comprised in the aqueous suspension.
15. The suspension of embodiment 8, wherein the amount of copper comprised in the zeolitic material according to (ii), calculated as CuO, is in the range of from 0 to less than 0.1 weight-%, preferably in the range of from 0 to 0.01 weight-%, more preferably in the range of from 0 to 0.001 weight-%, based on the total weight of the framework Si, Al and O of the zeolitic material, wherein more preferably, the zeolitic material according to (ii) is free of copper, and wherein in addition to the zeolitic material, the aqueous suspension comprises a source of copper, preferably selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO.
16. The suspension of embodiment 15, comprising the source of copper, calculated as CuO, in an amount in the range of from 1 to 13 weight-%, preferably in the range of from 1.5 to 8 weight-%, more preferably in the range of from 2 to 6 weight-%, based on the total weight of the framework Si, Al and O of the zeolitic material comprised in the aqueous suspension.
17. The suspension of any one of embodiments 8 to 16, wherein the amount of iron comprised in the zeolitic material according to (ii), calculated as $Fe_2O_3$, is in the range of from 0 to 0.01 weight-%, preferably in the range of from 0 to 0.001 weight-%, more preferably in the range of from 0 to 0.0001 weight-%, based on the total weight of the framework Si, Al and O of the zeolitic material.
18. The suspension of any one of embodiments 1 to 17, wherein from 95 to 100 weight-%, preferably from 98 to 100 weight-%, more preferably from 99 to 100 weight-%, more preferably from 99.5 to 100 weight-%, more preferably from 99.9 to 100 weight-% of the zeolitic material according to (ii) consist of Si, Al, O, optionally Cu, and optionally one or more of H and P.
19. The suspension of any one of embodiments 1 to 18, wherein the zeolitic material according to (ii) comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the framework Si, Al and O of the zeolitic material, and wherein preferably from 95 to 100 weight-%, more preferably from 98 to 100 weight-%, more preferably from 99 to 100 weight-% of the framework structure of the zeolitic material consists to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 5:1 to 48:1, more preferably in the range of from 10:1 to 45:1, more preferably in the range of from 11:1 to 40:1, more preferably in the range of from 12:1 to 38:1, more preferably in the range of from 13:1 to 35:1.
20. The suspension of any one of embodiments 1 to 19, wherein the mean crystallite size of the zeolitic material according to (ii) is at least 50 nanometer, preferably in the range of from 50 to 250 nanometer, more preferably in the range of from 70 to 200 nanometer, determined via X-ray diffraction as described in Reference Example 1.
21. The suspension of any one of embodiments 1 to 20, wherein the particles of the zeolitic material according to (ii) have a particle size distribution with a Dv90 value in the range of from 0.5 to 100 micrometer, preferably in the range of from 1 to 50 micrometer, more preferably in the range of from 1.5 to 25 micrometer, more preferably in the range of from 1.8 to 10 micrometer, determined via particle size distribution measurement as described in Reference Example 2.
22. The suspension of anyone of embodiments 1 to 21, wherein the particles of the zeolitic material according to (ii) have a size distribution with a Dv50 value in the range of from 0.3 to 50 micrometer, preferably in the range of from 0.4 to 15 micrometer, more preferably in the range of from 0.5 to 5 micrometer, determined via particle size distribution measurement as described in Reference Example 2.
23. The suspension of anyone of embodiments 1 to 22, wherein the particles of the zeolitic material according to (ii) have a size distribution with a Dv10 value in the range of from 0.1 to 10 micrometer, preferably in the range of from 0.2 to 5 micrometer, more preferably in the range of from 0.3 to 2 micrometer, determined via particle size distribution measurement as described in Reference Example 2.
24. The suspension of any one of embodiments 1 to 23, wherein the bidentate organic ligand according to (iii) comprises, preferably is, one or more of an alpha hydroxy acid, a beta hydroxy acid, a 2,4-diketone, and a 1,3-dicarbonyl compound, preferably one more of a C2 to C6 alpha hydroxy acid, a C3 to C6 beta hydroxy acid, a C3 to C6 1,3-dicarbonyl compound, and a C5 to C9 2,4-diketone, more preferably one or more of a C2 to C5 alpha hydroxy acid, a C3 to C5 beta hydroxy acid, a C3 to C5 1,3-dicarbonyl compound, and a C5 to C8 2,4-diketone, more preferably one or more of a C3 to C4 alpha hydroxy acid, a C3 to C4 beta hydroxy acid, a C3 to C4 1,3-dicarbonyl compound, and a C5 to C6 2,4-diketone.
25. The suspension of any one of embodiments 1 to 24, wherein the bidentate organic ligand according to (iii) consists of the elements carbon, hydrogen and oxygen.
26. The suspension of any one of embodiments 1 to 25, wherein the bidentate organic ligand according to (iii) comprises, preferably is, one or more of acetylacetone, glycolic acid, lactic acid, tartronic acid, ascorbic acid, glucuronic acid, tartaric acid and glucuronolactone, preferably one or more of glycolic acid, lactic acid, tartronic acid, ascorbic acid, glucuronic acid and glucuronolactone, more preferably one or more of glycolic acid, lactic acid, ascorbic acid and glucuronic acid, more preferably one or more of glycolic acid and lactic acid.
27. The suspension of any one of embodiments 1 to 26, wherein the bidentate organic ligand according to (iii) comprises, preferably is lactic acid.
28. The suspension of any one of embodiments 1 to 27, wherein the bidentate organic ligand according to (iii) has a solubility in water, measured at a temperature of the water of 20° C., of at least 20 g of said ligand to 100 mL of water, more preferably at least 25 g of said ligand to 100 mL of water, more preferably at least 30 g of said ligand to 100 mL of water.
29. The suspension of any one of embodiments 1 to 28, wherein the weight ratio of the water employed according to (i) relative to the total weight of Si, Al and O of the zeolitic material framework structure employed according to (ii), weight (water):weight (total sum of Si, Al and O of the zeolitic material), is in the range of from 80:20 to 40:60, preferably in the range of from 75:25 to 45:55, more preferably in the range of from 70:30 to 48:52, more preferably in the range of from 60:40 to 50:50.
30. The suspension of any one of embodiments 1 to 29, wherein the weight ratio of the zirconium ion comprised in the complex according to (iii), calculated as zirconium (IV) oxide, relative to the total weight of Si, Al and O of the zeolitic material framework structure according to (ii), weight (zirconium oxide):weight (total sum of framework Si, Al and O of the zeolitic material), is in the range of from 0.02:1 to 0.1:1, preferably in the range of from 0.03:1 to 0.08:1, more preferably in the range of from 0.04:1 to 0.06:1.
31. The suspension of any one of embodiments 1 to 30, wherein the weight ratio of the bidentate organic ligand relative to the zirconium ion, calculated as zirconium (IV) oxide, is in the range of from 0.01 to 2.0, more preferably in the range of from 0.05 to 1.0, more preferably in the range of from 0.1 to 0.9, more preferably in the range of from 0.15 to 0.8, more preferably in the range of from 0.175 to 0.75, more preferably in the range of from 0.2 to 0.7.
32. The suspension of any one of embodiments 1 to 31, wherein the amount of zirconium oxychloride, comprised in the suspension, is in the range of from 0 to 3 weight-%, preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension.
33. The suspension of any one of embodiments 1 to 32, wherein the amount of zirconium sulfate comprised in the suspension is in the range of from 0 to 3 weight-%, preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension.
34. The suspension of any one of embodiments 1 to 33, wherein the amount of one or more alkali metals Li, Na, K and Cs comprised in the suspension, more preferably one or more alkali metals Li, Na and K, more preferably one or more alkali metals Na and K, more preferably the alkali metal Na, is in the range of from 0 to 10 weight-%, more preferably in the range of from 0 to 5 weight-%, more preferably in the range of from 0 to 3 weight-%, more preferably in the range of from 0 to 2 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, based on the total weight of the alkali metals present and the total weight of the suspension.
35. The suspension of any one of embodiments 1 to 34, wherein the liquid phase of the suspension has a pH in the range of from 0 to 12, preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5, more preferably in the range of from 3.7 to 5.5, wherein the pH is determined as described in Reference Example 3.
36. The suspension of any one of embodiments 1 to 35, having a viscosity in the range of from 2 mPas to 1000 mPas, more preferably in the range of from 5 mPas to 800 mPas determined at 100 $s^{-1}$ as described in Reference Example 4.

37. The suspension of any one of embodiments 1 to 36, further comprising in addition to the components according to (i), (ii) and (iii)
    (iv) one or more of a refractory metal oxide and a precursor of a refractory metal oxide.
38. The suspension of embodiment 37, wherein the one or more of a refractory metal oxide and a precursor of a refractory metal oxide comprises, preferably is, one or more of an alumina, a silica, a titania, an aluminum hydroxide, an aluminum oxyhydroxide, an aluminum salt, a colloidal alumina, a silicon alcoholate, a colloidal silica, a fumed silica, a water glass, a titanium alcoholate, and a colloidal titania; preferably one or more of an alumina, a silica, an aluminum hydroxide, an aluminum oxyhydroxide, an aluminum salt, a colloidal alumina, a silicon alcoholate, a colloidal silica, a fumed silica, and a water glass; more preferably one or more of an alumina, a silica, an aluminum hydroxide, an aluminum oxyhydroxide, an aluminum salt, and a colloidal alumina; more preferably one or more of an alumina and a silica, more preferably an alumina.
39. The suspension of any one of embodiments 37 or 38, wherein the weight ratio of the one or more of a refractory metal oxide and a precursor of a refractory metal oxide relative to the total weight of the framework Si, Al and O of the zeolitic material, weight (iv):weight (total sum of framework Si, Al and O of the zeolitic material), is in the range of from 0.01:1 to 0.13:1, preferably in the range of from 0.03:1 to 0.11:1, more preferably in the range of from 0.05:1 to 0.09:1.
40. The suspension of any one of embodiments 1 to 39, further comprising in addition to the components according to (i), (ii), (iii) and optionally (iv)
    (v) an organic base.
41. The suspension of embodiment 33, wherein the organic base according to (v) is one or more of ammonia and a C1 to C6 amine, preferably one or more of ammonia and a C1 to C5 amine, more preferably one or more of ammonia and a C1 to C4 amine, more preferably one or more of ammonia and a C1 to C3 amine, more preferably one or more of ammonia and a C1 to C2 amine, more preferably one or more of triethanolamine, diethanolamine, ethanolamine and ammonia, the organic base more preferably comprising, more preferably being ethanolamine.
42. The suspension of embodiment 40 or 41, wherein the weight ratio of the organic base relative to the total weight of the framework Si, Al and O of the zeolitic material, weight (organic base):weight (total sum of framework Si, Al and O of the zeolitic material), is in the range of from 0.01:1 to 0.5:1, preferably in the range of from 0.015:1 to 0.1:1, more in the range of from 0.02:1 to 0.05:1.
43. The suspension of any one of embodiments 40 to 42, wherein the liquid phase of the suspension has a pH in the range of from 0 to 12, preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5.5, wherein the pH is determined as described in Reference Example 3.
44. The suspension of any one of embodiments 40 to 43, having a viscosity in the range of from 2 mPas to 1000 mPas, more preferably in the range of from 5 mPas to 800 mPas, determined at $100 \; s^{-1}$ as described in Reference Example 4.
45. The suspension of any one of embodiments 1 to 44, having storage stability in the range of from 1 d to 120 d, preferably in the range of from 1 d to 60 d, more preferably in the range of from 1 d to 30 d, determined as described in Reference Example 5.
46. The suspension of any one of embodiments 1 to 45, further comprising one or more adhesion promotors, more preferably one or more of a polyacetylene, a polycarboxylate and a polyethylene glycol.
47. The suspension of any one of embodiments 1 to 46, further comprising one or more dispersing agents, more preferably one or more of a poly(carboxylate ether), a poly(aryl ether), a poly(acrylic acid) and a polyethylene glycol.
48. The suspension of any one of embodiments 1 to 47, further comprising one or more rheology modifiers, more preferably one or more of a cellulose ether, a carboxy methyl cellulose, a hydroxy ethyl cellulose, a hydroxy ethyl methyl cellulose, and an optionally hydrophobically modified polyurethanes thickener.
49. A process for preparing an aqueous suspension, preferably the aqueous suspension according to any one of embodiments 1 to 48, comprising
    (a) mixing water and a zirconium salt;
    (b) adding a bidentate organic ligand to the mixture obtained from (a), obtaining an aqueous solution comprising a chelate complex comprising a zirconium ion and the bidentate organic ligand bonded to said zirconium ion via zirconium oxygen bonds from two oxygen atoms comprised in said ligand;
    (c) adding a zeolitic material and one or more of copper and iron to the aqueous solution obtained from (b), obtaining an aqueous suspension, wherein the one or more of copper and iron is either comprised in the zeolitic material, or in a source of one or more of copper and iron, or in the zeolitic material and in a source of one or more of copper and iron.
50. The process of embodiment 49, wherein the water according to (a) is deionized water, the water preferably having a conductivity in the range of from 50 to 4000 microSiemens/cm, more preferably in the range of from 100 to 3000 microSiemens/cm, more preferably in the range of from 150 to 200 microSiemens/cm, determined as described in Reference Example 6.
51. The process of embodiment 49 or 50, wherein according to (a), the mixing is carried out at a temperature of the water in the range of from 4 to 40° C., preferably in the range of from 10 to 30° C., more preferably in the range of from 12 to 25° C.
52. The process of any one of embodiments 49 to 51, wherein the zirconium salt according to (a) is one or more of a zirconium carboxylate, a zirconium alcoholate, and a zirconium nitrate, preferably one or more of a zirconium carboxylate and a zirconium nitrate.
53. The process of embodiment 52, wherein the zirconium carboxylate comprises, preferably is one or more of a C1 to C7 carboxylate, preferably one or more of a zirconium C1 to C6 carboxylate, more preferably one or more of a zirconium C1 to C5 carboxylate, more preferably one or more of a zirconium C1 to C4 carboxylate, more preferably one or more of a zirconium C1 to C3 carboxylate, more preferably one or more of a zirconium C1 to C2 carboxylate.
54. The process of embodiment 53, wherein the zirconium salt comprises, preferably is zirconium acetate
55. The process of any one of embodiments 49 to 54, wherein according to (a), the mixing is carried out for a duration in the range of from 1 to 30 min, preferably in the range of from 2 to 25 min, more preferably in the range of from 5 to 20 min, more preferably in the range of from 8 to 15 min, more preferably in the range of from 9 to 14 min, more preferably in the range of from 10 to 12 min.

56. The process of any one of embodiments 49 to 55, wherein the bidentate organic ligand according to (b) comprises, preferably is, one or more of an alpha hydroxy acid, a beta hydroxy acid, a 2,4-diketone, and a 1,3-dicarbonyl compound, preferably one or more of a C2 to C6 alpha hydroxy acid, a C3 to C6 beta hydroxy acid, a C3 to C6 1,3-dicarbonyl compound, and a C5 to C9 2,4-diketone, more preferably one or more of a C2 to C5 alpha hydroxy acid, a C3 to C5 beta hydroxy acid, a C3 to C5 1,3-dicarbonyl compound, and a C5 to C8 2,4-diketone, more preferably one or more of a C3 to C4 alpha hydroxy acid, a C3 to C4 beta hydroxy acid, a C3 to C4 1,3-dicarbonyl compound, and a C5 to C6 2,4-diketone.

57. The process of any one of embodiments 49 to 56, wherein the bidentate organic ligand according to (b) consists of the elements carbon, hydrogen and oxygen.

58. The process of any one of embodiments 49 to 57, wherein the bidentate organic ligand according to (b) comprises, preferably is, one or more of acetylacetone, glycolic acid, lactic acid, tartronic acid, ascorbic acid, glucuronic acid, and glucuronolactone, preferably one or more of glycolic acid, lactic acid, tartronic acid, ascorbic acid, glucuronic acid, and glucuronolactone, more preferably one or more of glycolic acid, lactic acid, ascorbic acid, and glucuronic acid, more preferably one or more of glycolic acid and lactic acid.

59. The process of embodiment 58, wherein the bidentate organic ligand according to (b) comprises, preferably is lactic acid.

60. The process of any one of embodiments 49 to 59, wherein according to (b), the addition of the bidentate organic ligand is carried out at a temperature of the mixture obtained in (a) at a temperature of the water in the range of from 4 to 40° C., preferably in the range of from 10 to 30° C., more preferably in the range of from 12 to 25° C.

61. The process of any one of embodiments 49 to 60, wherein according to (b) the bidentate organic ligand is added with mixing, the mixing is conducted for a duration in the range of from 1 to 30 min, preferably in the range of from 2 to 25 min, more preferably in the range of from 5 to 20 min, more preferably in the range of from 8 to 15 min, more preferably in the range of from 9 to 14 min, more preferably in the range of from 10 to 12 min.

62. The process of any one of embodiments 49 to 61, wherein the zeolitic material according to (c) has framework type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, or a mixed type of two or more thereof, preferably AEI, GME, CHA, MFI, BEA, FAU, MOR, a mixture of two or more thereof or a mixed type of two or more thereof, more preferably AEI, GME, CHA, FAU, MOR, a mixture of two or more thereof or a mixed type of two or more thereof, more preferably AEI, CHA, BEA, a mixture of two or more thereof or a mixed type of two or more thereof, more preferably CHA or AEI.

63. The process of any one of embodiments 49 to 62, wherein the zeolitic material according to (c) has framework type CHA.

64. The process of any one of embodiments 49 to 63, wherein in the framework structure of the zeolitic material according to (c), the molar ratio of Si to Al, calculated as $SiO_2:Al_2O_3$, is in the range of from 2:1 to 50:1, preferably in the range of from 5:1 to 48:1, more preferably in the range of from 10:1 to 45:1, more preferably in the range of from 11:1 to 40:1, more preferably in the range of from 12:1 to 38:1, more preferably in the range of from 13:1 to 35:1.

65. The process of any one of embodiments 49 to 64, wherein from 95 to 100 weight-%, preferably from 98 to 100 weight-%, more preferably from 99 to 100 weight-% of the framework structure of the zeolitic material according to (c) consists of Si, Al, O, optionally one or more of Cu and Fe, and optionally one or more of H and P.

66. The process of any one of embodiments 49 to 65, wherein according to (c), a zeolitic material and copper are added to the aqueous solution obtained from (b), wherein the copper is either comprised in the zeolitic material, or in a source of copper, or in the zeolitic material and in a source of copper.

67. The process of any one of embodiments 49 to 66, wherein the zeolitic material added according to (c) comprises copper in an amount, calculated as CuO, in the range of 1 to 10 weight-%, preferably in the range of from 1.5 to 8 weight-%, preferably in the range of from 1.8 to 6 weight-%, preferably in the range of from 2 to 5.5 weight-%, preferably in the range of from 2 to 5 weight-%, more preferably in the range of from greater than 2 to less than 5 weight-%, preferably in the range of from 2.1 to 4.9 weight-%, preferably in the range of from 2.2 to 4.8 weight-%, based on the total weight of the framework Si, Al and O of the zeolitic material.

68. The process of embodiment 67, wherein according to (c), no source of copper is added in addition to the zeolitic material comprising copper.

69. The process of embodiment 68, wherein the amount of copper comprised in the zeolitic material added according to (c), calculated as CuO, is in the range of from 0.1 to 3 weight-%, preferably in the range of from 0.2 to 2 weight-%, more preferably in the range of from 0.5 to 1.75 weight-%, based on the total weight of the framework Si, Al and O of the zeolitic material.

70. The process of embodiment 67, wherein in addition to the zeolitic material, a source of copper is added according to (c).

71. The process of embodiment 70, wherein the source of copper is selected from the group consisting of copper acetate, copper nitrate, copper sulfate, copper formate, copper oxide, and a mixture of two or more thereof, preferably selected from the group consisting of copper acetate, copper oxide, and a mixture of thereof, wherein more preferably, the source of copper is copper oxide, more preferably CuO.

72. The process of embodiment 70 or 71, wherein the source of copper, calculated as CuO, is added according to (c) in an amount in the range of from 1 to 10 weight-%, preferably in the range of from 1.5 to 5 weight-%, more preferably in the range of from 1.5 to 4 weight-%, based on the total weight of the framework Si, Al and O of the zeolitic material added according to (c).

73. The process of embodiment 66, wherein the amount of copper comprised in the zeolitic material added according to (c), calculated as CuO, is in the range of from 0 to less than 0.1 weight-%, preferably in the range of from 0 to 0.01 weight-%, more preferably in the range of from 0 to 0.001 weight-%, based on the the total weight of the framework Si, Al and O of the zeolitic material, wherein in addition to the zeolitic material, a source of copper is added according to (c).

74. The process of embodiment 73, wherein the source of copper is selected from the group consisting of copper acetate, copper nitrate, copper sulfate, copper formate, copper oxide, and a mixture of two or more thereof, preferably selected from the group consisting of copper acetate, copper oxide, and a mixture of thereof, wherein more preferably, the source of copper is copper oxide, more preferably CuO.

75. The process of embodiment 73 or 74, wherein the source of copper, calculated as CuO, is preferably added according to (c) in an amount in the range of from 1 to 13 weight-%, preferably in the range of from 1.5 to 8 weight-%, more preferably in the range of from 2 to 6 weight-%, based on the total weight of the framework Si, Al and O of the zeolitic material added according to (c).

76. The process of any one of embodiments 66 to 75, wherein the amount of iron comprised in the zeolitic material according to (c), calculated as $Fe_2O_3$, is in the range of from 0 to 0.01 weight-%, preferably in the range of from 0 to 0.001 weight-%, more preferably in the range of from 0 to 0.0001 weight-%, based on the total weight of the framework Si, Al and O of the zeolitic material.

77. The process of any one of embodiments 49 to 76, wherein from 95 to 100 weight-%, preferably from 98 to 100 weight-%, more preferably from 99 to 100 weight-%, more preferably from 99.5 to 100 weight-%, more preferably from 99.9 to 100 weight-% of the zeolitic material according to (c) consist of Si, Al, O, optionally Cu, and optionally one or more of H and P.

78. The process of any one of embodiments 49 to 77, wherein the zeolitic material according to (c) comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the framework Si, Al and O of the zeolitic material, and wherein preferably from 95 to 100 weight-%, more preferably from 98 to 100 weight-%, more preferably from 99 to 100 weight-% of the framework structure of the zeolitic material consists to Si, Al, O, and optionally one or more of H and P, wherein in the framework structure, the molar ratio of Si to Al, calculated as $SiO_2:Al_2O_3$, is preferably in the range of from 2:1 to 50:1, more preferably in the range of from 5:1 to 48:1, more preferably in the range of from 10:1 to 45:1, more preferably in the range of from 11:1 to 40:1, more preferably in the range of from 12:1 to 38:1, more preferably in the range of from 13:1 to 35:1.

79. The process of any one of embodiments 49 to 78, wherein the mean crystallite size of the zeolitic material according to (c) is at least 50 nanometer, preferably in the range of from 50 to 250 nanometer, more preferably in the range of from 70 to 200 nanometer, determined via X-ray diffraction as described in Reference Example 1.

80. The process of any one of embodiments 49 to 79, wherein the zeolitic material according to (c) has a particle size distribution with a Dv90 value in the range of from 0.5 to 100 micrometer, preferably in the range of from 1 to 50 micrometer, more preferably in the range of from 1.5 to 25 micrometer, more preferably in the range of from 1.8 to 10 micrometer, determined via particle size distribution measurement as described in Reference Example 2.

81. The process of any one of embodiments 49 to 80, wherein the zeolitic material according to (c) has a particle size distribution with a Dv50 value in the range of from 0.3 to 50 micrometer, preferably in the range of from 0.4 to 15 micrometer, more preferably in the range of from 0.5 to 5 micrometer, determined via particle size distribution measurement as described in Reference Example 2.

82. The process of any one of embodiments 49 to 81, wherein the zeolitic material according to (c) has a particle size distribution with a Dv10 value in the range of from 0.1 to 10 micrometer, preferably in the range of from 0.2 to 5 micrometer, more preferably in the range of from 0.3 to 2 micrometer, determined via particle size distribution measurement as described in Reference Example 2.

83. The process of any one of embodiments 49 to 82, wherein adding the zeolitic material according to (c) comprises dispersing the zeolitic material in the aqueous solution obtained from (b).

84. The process of embodiment 83, wherein according to (c) the zeolitic material is dispersed in the aqueous solution at a temperature of the water in the range of from 4 to 40° C., preferably in the range of from 10 to 30° C., more preferably in the range of from 12 to 25° C.

85. The process of embodiment 83 or 84, wherein according to (c) the zeolitic material is dispersed in the aqueous solution for a duration in the range of from 1 to 30 min, preferably in the range of from 2 to 25 min, more preferably in the range of from 5 to 20 min, more preferably in the range of from 8 to 15 min, more preferably in the range of from 9 to 14 min, more preferably in the range of from 10 to 12 min.

86. The process of any one of embodiments 49 to 85, wherein the liquid phase of the suspension obtained from (c) has a pH in the range of from 0 to 12, preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5, more preferably in the range of from 3.7 to 5.5, wherein the pH is determined as described in Reference Example 3.

87. The process of any one of embodiments 49 to 86, wherein the weight ratio of the water employed according to (a) relative to the total weight of the framework Si, Al and O of the zeolitic material employed according to (c), weight (water):weight (total sum of framework Si, Al and O of the zeolitic material), is in the range of from 80:20 to 40:60, preferably in the range of from 75:25 to 45:55, more preferably in the range of from 70:30 to 48:52, more preferably in the range of from 60:40 to 50:50.

88. The process of any one of embodiments 49 to 87, wherein the weight ratio of the zirconium salt employed according to (a), calculated as zirconium (IV) oxide, relative to the total weight of the framework Si, Al and O of the zeolitic material employed according to (c), weight (zirconium):weight (total sum of framework Si, Al and O of the zeolitic material), is in the range of from 0.02:1 to 0.1:1, preferably in the range of from 0.03:1 to 0.08:1, more preferably in the range of from 0.04:1 to 0.06:1.

89. The process of any one of embodiments 49 to 88, wherein the weight ratio of the bidentate organic ligand employed according to (b) relative to the zirconium salt employed according to (a), calculated as zirconium (IV) oxide, is in the range of from 0.01 to 2.0, more preferably in the range of from 0.05 to 1.0, more preferably in the range of from 0.1 to 0.9, more preferably in the range of from 0.15 to 0.8, more preferably in the range of from 0.175 to 0.75, more preferably in the range of from 0.2 to 0.7.

90. The process of any one of embodiments 49 to 89, wherein the viscosity of the suspension obtained from (c) is in the range of from 2 mPas to 1000 mPas, preferably in the range of from 5 mPas to 800 mPas determined at 100 s$^{-1}$ as described in Reference Example 4.

91. The process of any one of embodiments 49 to 90, further comprising
    (d) adding one or more of a refractory metal oxide and a precursor of a refractory metal oxide to the aqueous solution obtained from (b) or to the suspension obtained from (c).

92. The process of embodiment 91, wherein the one or more of a refractory metal oxide and a precursor of a refractory metal oxide comprises, preferably is, one or more of an alumina, a silica, a titania, an aluminum hydroxide, an aluminum oxyhydroxide, an aluminum salt, a colloidal alumina, a silicon alcoholate, a colloidal silica, a fumed silica, a water glass, a titanium alcoholate, and a colloidal titania; preferably one or more of an alumina, a silica, an aluminum hydroxide, an aluminum oxyhydroxide, an aluminum salt, a colloidal alumina, a silicon alcoholate, a colloidal silica, a fumed silica, and a water glass; more preferably one or more of an alumina, a silica, an aluminum hydroxide, an aluminum oxyhydroxide, an aluminum salt, and a colloidal alumina; more preferably one or more of an alumina and a silica.

93. The process of embodiment 92, wherein the one or more of a refractory metal oxide and a precursor of a refractory metal oxide comprises, preferably is an alumina.

94. The process of any one of embodiments 91 to 93, wherein the weight ratio of the one or more of a refractory metal oxide and a precursor of a refractory metal oxide employed according to (d) relative to the total weight of the framework Si, Al and O of the zeolitic material employed according to (c), weight (d):weight (total sum of framework Si, Al and O of the zeolitic material), is in the range of from 0.01:1 to 0.13:1, preferably in the range of from 0.03:1 to 0.11:1, more preferably in the range of from 0.05:1 to 0.09:1.

95. The process of any one of embodiments 49 to 94, further comprising adding an organic base to the aqueous solution obtained before (c) and/or to the suspension obtained after (c).

96. The process of embodiment 95, wherein the organic base is one or more of ammonia and a C1 to C6 amine, preferably one or more of ammonia and a C1 to C5 amine, more preferably one or more of ammonia and a C1 to C4 amine, more preferably one or more of ammonia and a C1 to C3 amine, more preferably one or more of ammonia and a C1 to C2 amine, more preferably one or more of ethanolamine, ethanolamine, ethanolamine and ammonia, the organic base more preferably comprising, more preferably being ethanolamine.

97. The process of embodiment 95 or 96, wherein the pH of the aqueous solution obtained before (c) or the liquid phase of the suspension obtained after (c) is in the range of from 0 to 12, preferably in the range of from 0.5 to 11, more preferably in the range of from 1 to 10, more preferably in the range of from 1.5 to 9, more preferably in the range of from 2 to 8, more preferably in the range of from 2.5 to 7, more preferably in the range of from 3 to 6, more preferably in the range of from 3.5 to 5.5, wherein the pH is determined as described in Reference Example 3.

98. The process of any one of embodiments 95 to 97, wherein the suspension obtained from (c) or (d) has a viscosity in the range of from 2 mPas to 1000 mPas, preferably in the range of from 5 mPas to 800 mPas, determined at 100 s$^{-1}$ as described in Reference Example 4.

99. The process of any one of embodiments 49 to 98, further comprising adding one or more adhesion promotors to the solution obtained from (b) and/or the suspension obtained from (c), wherein the one or more adhesion promoters comprises, preferably is one or more of a polyacetylene, a polycarboxylate and a polyethylene glycol.

100. The process of any one of embodiments 49 to 99, further comprising adding one or more dispersing agents to the solution obtained from (b) and/or the suspension obtained from (c), wherein the one or more dispersing agents comprises, preferably is one or more of a poly(carboxylate ether), a poly(aryl ether), a poly(acrylic acid) and a polyethylene glycol.

101. The process of any one of embodiments 49 to 100, further comprising adding one or more rheology modifiers to the solution obtained from (b) and/or the suspension obtained from (c), wherein the one or more rheology modifiers comprises, preferably is one or more of a cellulose ether, a carboxy methyl cellulose, a hydroxy ethyl cellulose, a hydroxy ethyl methyl cellulose, and an optionally hydrophobically modified polyurethanes thickener.

102. The process of any one of embodiments 49 to 101, wherein during the entire process, the amount of zirconium oxychloride, preferably the amount of zirconium halide added is in the range of from 0 to 3 weight-%, preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension obtained from (c) or (d).

103. The process of any one of embodiments 49 to 102, wherein during the entire process, the amount of zirconium sulfate added is in the range of from 0 to 3 weight-%, preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension.

104. The process of any one of embodiments 49 to 103, wherein before (c), the solution comprises one or more alkali metals Li, Na, K and Cs, more preferably one or more alkali metals Li, Na and K, more preferably one or more alkali metals Na and K, more preferably the alkali metal Na in an amount in the range of from 0 to 10 weight-%, preferably in the range of from 0 to 5 weight-%, more preferably in the range of from 0 to 3 weight-%, more preferably in the range of from 0 to 2 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the solution.

105. The process of any one of embodiments 49 to 104, wherein the aqueous suspension obtained from (c) comprises one or more alkali metals Li, Na, K and Cs, more preferably one or more alkali metals Li, Na and K, more preferably one or more alkali metals Na and K, more preferably the alkali metal Na in an amount in the range of from 0 to 10 weight-%, more preferably in the range of from 0 to 5 weight-%, more preferably in the range of from 0 to 3 weight-%, more preferably in the range of from 0 to 2 weight-%, more preferably in the range of from 0 to 1 weight-%, more preferably in the range of from 0 to 0.5 weight-%, more preferably in the range of from 0 to 0.1 weight-%, more preferably in the range of from 0 to 500 weight-ppm, more preferably in the range of from 0 to 100 weight-ppm, more preferably in the range of from 0 to 50 weight-ppm, more preferably in the range of from 0 to 10 weight-ppm, more preferably in the range of from 0 to 5 weight-ppm, more preferably in the range of from 0 to 1 weight-ppm, based on the total weight of the suspension.

106. An aqueous suspension, preferably the aqueous suspension according to any one of embodiments 1 to 49, obtained or obtainable by a process according to any one of embodiments 49 to 105.

107. Use of the aqueous suspension according to any one of embodiments 1 to 48 or 106 for preparing a selective catalytic reduction catalyst, preferably for preparing a selective catalytic reduction catalyst for the treatment of the exhaust gas stream of a diesel engine.

108. The use of embodiment 107, wherein the aqueous suspension is used as a washcoat or as an intermediate for producing a washcoat, wherein said washcoat is preferably coated onto a substrate, preferably a flow-through substrate or a wall-flow substrate.

109. The use of embodiment 108, wherein the substrate comprises, preferably is a ceramic or a metallic substrate.

110. The use of embodiment 109, wherein the substrate comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

111. The use of embodiment 109, wherein the substrate comprises, preferably consists of a metallic substance, wherein the metallic substance preferably comprises, more preferably consists of, oxygen and one or more of iron, chromium, and aluminum.

112. A process for preparing a selective catalytic reduction catalyst, preferably for the treatment of the exhaust gas stream of a diesel engine, said process comprising applying a washcoat onto an optionally pretreated substrate, preferably a flow-through substrate or a wall-flow substrate, wherein the washcoat comprises or consists of the aqueous suspension according to any one of embodiments 1 to 48 or 106.

113. The process of embodiment 112, wherein the substrate comprises, preferably is a ceramic or a metallic substrate.

114. The process of embodiment 113, wherein the substrate comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

115. The process of embodiment 113, wherein the substrate comprises, preferably consists of a metallic substance, wherein the metallic substance preferably comprises, more preferably consists of, oxygen and one or more of iron, chromium, and aluminum.

The present invention is further characterized by the following Reference Examples, Examples and Comparative Examples.

Reference Example 1: X-Ray Diffraction

The mean crystallite size of the zeolitic material was determined via x-ray diffraction using D8 Advance Series 2 (Bruker) and Diffrac. Topas XRD software.

Reference Example 2: Particle Size Distribution

The particle size distribution and the Dv10, Dv50 and Dv90 values of the zeolitic material were determined using a Mastersizer 3000 (Malvern) equipped with a Hydro MV dispersion unit. Ultrasonication duration: 10 min at 100% power. Temperature during size measurement: 25° C. Laser obscuration: 7-12%. Stirrer speed demand 1000 r.p.m. Analysis model: general purpose. Fine powder modus: on. Analysis sensitivity: normal. Scattering model: Mie with particle refractive index 1.48 particle absorption index 0.10. Size: weighted by volume (v).

Reference Example 3: Determination of pH

The pH was determined via Portamess type 911 pH (Knick) using a pH electrode type BlueLine 18 pH (Co. SI Analytics). The samples were thoroughly mixed before measurement. The steady pH was recorded.

Reference Example 4: Determination of Viscosity

All viscosity measurements were conducted with an AntonPaar MCR 302 Rheometer using a plate-plate geometry (diameter 50 mm), 18° C., rotational mode, shear rate from 0.1 s$^{-1}$ to 1000 s$^{-1}$ (41 measurements points with 2 seconds duration each). Specific values were measured at a shear rate of 10 s$^{-1}$, 50 s$^{-1}$, 100 s$^{-1}$ and 316 s$^{-1}$ as indicated in Table 3. The samples were carefully homogenized before measurement to avoid air entrainment.

Reference Example 5: Determination of Storage Stability

Bidentate ligands in the presence of a zirconium ion source having passed both qualitative visual tests for precipitation described below in Reference Example 8 were evaluated quantitatively by viscosity measurement for storage stability in inventive suspensions with a metal zeolite and optionally alumina.

Several duplicates of suspensions prepared according to Comparative Examples 1 to 6 and Examples 1 to 12 were transferred into sealable vessels. The suspensions were stored at 23° C. overnight under continuous movement, a portion of the suspension was analyzed according to Reference Example 4 and the results are shown in table 3 under the shear rates labeled initial storage viscosity for shear rates of 10 s$^{-1}$, 50 s$^{-1}$, 100 s$^{-1}$ and 316 s$^{-1}$. A portion of the overnight stored suspensions were further heated to 32° C. in closed vessels in a conventional drying oven for 2 hours, respectively, without any movement. The heated samples were then taken out of the oven, cooled to 23° C. under continuous movement, the suspension was analyzed according to Reference Example 4 and the results are shown in table 3 under the shear rates labeled heated storage viscosity for shear rates of 10 s$^{-1}$, 50 s$^{-1}$, 100 s$^{-1}$ and 316 s$^{-1}$. Both the ambient temperature and heated samples were analyzed, the results of which are given in Table 3. The samples were considered stable if the percent difference between the heated and initial viscosities did not show a substantial increase in comparison to the same viscosity percent difference observed in the corresponding comparative example free of the bidentate organic ligand.

Reference Example 6: Determination Conductivity, E.G. of Deionized Water

The conductivity was determined via Portamess type 911 Cond (Knick) using an electrode type Knick, SE 204 (Knick). The steady conductivity was recorded.

Reference Example 7: Zeolitic Materials Having Framework Type CHA

Reference Example 7.1: A zeolitic material powder was provided having framework type CHA and having a framework structure characterized by a molar ratio silica:alumina (SiO$_2$:Al$_2$O$_3$, SAR) between 20:1 and 30:1, having a copper content, calculated as CuO and based on the total weight of the framework Si, Al and O of the zeolitic material, of up to 5 weight-%, having a Dv90 between 1 and 10 micrometer, determined as described in Reference Example 2, and exhibiting a crystallite size between 50 and 200 nm determined as described in Reference Example 1. Specifically, a zeolitic material was provided characterized by a molar ratio silica:alumina (SiO$_2$:Al$_2$O$_3$, SAR) of 25:1, having a copper content, calculated as CuO and based on the total weight of the framework Si, Al and O of the zeolitic material, of 3.5 weight-%, having a Dv90 of 3.7 micrometer, a Dv50 of 1.3 micrometer, a Dv10 of 0.7 micrometer, determined as described in Reference Example 2, and exhibiting a crystallite size of 149 nm determined as described in Reference Example 1.

Reference Example 7.2: A zeolitic material powder was provided having framework type CHA and having a framework structure characterized by a molar ratio silica:alumina (SiO$_2$:Al$_2$O$_3$, SAR) between 25:1 and 35:1, having a copper content, calculated as CuO and based on the total weight of the framework Si, Al and O of the zeolitic material, of up to 5 weight-%, having a Dv90 of between 1 and 10 micrometer determined as described in Reference Example 2, and exhibiting a crystallite size between 50 and 200 nm determined as described in Reference Example 1. Specifically, a zeolitic material was provided characterized by a molar ratio silica:alumina (SiO$_2$:Al$_2$O$_3$, SAR) of 28.5:1, having a copper content, calculated as CuO and based on the total weight of the framework Si, Al and O of the zeolitic material, of 3.5 weight-%, having a Dv90 of 3.6 micrometer, a Dv50 of 1.3 micrometer, a Dv10 of 0.7 micrometer, determined as described in Reference Example 2, and exhibiting a crystallite size of 139 nm determined as described in Reference Example 1.

Reference Example 7.3: A zeolitic material powder was provided having framework type CHA and having a framework structure characterized by a molar ratio silica:alumina (SiO$_2$:Al$_2$O$_3$, SAR) between 10:1 and 25:1, having a copper content, calculated as CuO and based on the total weight of the framework Si, Al and O of the zeolitic material, of up to 5 weight-% having a Dv90 between 1 and 10 micrometer determined as described in Reference Example 2, and exhibiting a crystallite size between 50 and 200 nm determined as described in Reference Example 1. Specifically, a zeolitic material was provided characterized by a molar ratio silica:alumina (SiO$_2$:Al$_2$O$_3$, SAR) of 18.7:1, having a copper content, calculated as CuO and based on the total weight of the framework Si, Al and O of the zeolitic material, of 4.8 weight-%, having a Dv90 of 6.9 micrometer, a Dv50 of 2.9 micrometer, a Dv10 of 0.7 micrometer, determined as described in Reference Example 2, and exhibiting a crystallite size of 78 nm determined as described in Reference Example 1.

Reference Example 7.4: A zeolitic material powder was provided having framework type CHA and having a framework structure characterized by a molar ratio silica:alumina (SiO$_2$:Al$_2$O$_3$, SAR) of between 10:1 and 25:1, having a copper content, calculated as CuO and based on the total weight of the framework Si, Al and O of the zeolitic material of up to 5 weight-%, having a Dv90 between 1 and 10 micrometer determined as described in Reference Example 2, and exhibiting a crystallite size between 50 and 200 nm determined as described in Reference Example 1. Specifically, a zeolitic material was provided characterized by a molar ratio silica:alumina (SiO$_2$:Al$_2$O$_3$, SAR) of 18:4, having a copper content, calculated as CuO and based on the total weight of the framework Si, Al and O of the zeolitic material, of 0 weight-%, having a Dv90 of 2.1 micrometer, a Dv50 of 0.6 micrometer, a Dv10 of 0.4 micrometer, determined as described in Reference Example 2, and exhibiting a crystallite size of 102 nm determined as described in Reference Example 1.

Reference Example 8: Zirconium Sol Gel/Precipitation Inhibition Test

A stability test to evaluate chelating organic bidentate ligands effect on zirconium sol gel formation under acidic and basic pH was conducted. Any precipitation observed during the following test by visual inspection was considered unstable and failed the qualitative analysis stability test. Deionized water and zirconium (IV) acetate $Zr(OAc)_x$ solution, having a zirconium content, calculated as $ZrO_2$, of 30 weight-%, were mixed at 23° C. Subsequently, an organic ligand was added (see Table 1 below) with stirring. The results are described below in Table 1, including a control experiment with deionized water and $Zr(OAc)_x$ only, without ligand. For samples which showed stable clear solutions the pH was then adjusted to a value of 8-9 with monoethanolamine (MEA). The final formulations had a composition $H_2O$:zirconium acetate:organic ligand of 90:5:5. The results are described below in Table 2, including a control experiment with deionized water, $Zr(OAc)_x$ and MEA only, without ligand.

TABLE 1

Zirconium sol gel/precipitation test under acidic conditions

| sample | organic ligand | pH | Appearance |
| --- | --- | --- | --- |
| a | — | 3.1 | clear |
| b | glycolic acid | 1.9 | clear |
| c | lactic acid | 2.1 | clear |
| d | glucuronolactone | 3.1 | clear |
| e | D-glucoronic acid | 2.2 | clear |
| f | ascorbic acid | 2.1 | clear |
| g | acetylacetone | 3.5 | clear |
| h | glycine | 4.6 | clear |
| i | alanine | 4.5 | clear |
| j | acetic acid | 2.5 | clear |
| k | 2,5-dihydroxybenzoic acid | — | turbid, precipitate |
| l | mandelic acid | — | turbid, precipitate |
| m | tartaric acid | — | turbid, precipitate |
| n | citric acid | — | turbid, precipitate |
| o | malic acid | — | turbid, precipitate |

TABLE 2

Zirconium sol gel/precipitation test under basic conditions

| sample | organic ligand | pH | Appearance |
| --- | --- | --- | --- |
| a | — | 9.1 | turbid, precipitate |
| b | glycolic acid | 8.5 | clear |
| c | lactic acid | 8.1 | clear |
| d | glucuronolactone | 8.3 | clear |
| e | D-glucoronic acid | 8.2 | clear |
| f | ascorbic acid | 8.3 | clear |
| g | acetylacetone | 8.1 | clear |
| h | glycine | 8.2 | turbid, precipitate |
| i | alanine | 8.3 | turbid, precipitate |
| j | acetic acid | 8.1 | turbid, precipitate |

Reference Example 9: pH of Suspensions Consisting of Water and Zeolitic Materials Having Framework Type CHA A suspension consisting of deionized water and 31 to 35 wt.-% zeolitic material calculated on the basis of the total weight of the suspension was formed by mixing the two components. The pH of the suspension was measured according to Reference example 3 at 20° C. Results for zeolitic materials according to Reference Examples 7.1 to 7.3 are given below.

Reference example 9.1: 29.95 grams of zeolitic material according to Reference Example 7.1 was thoroughly mixed with 60.10 grams deionized water and the pH was measured according to Reference Example 3 under stirring at 20° C. The suspension was found to have a pH value of 4.0. The suspension was allowed to stir under the same conditions for 24 hours and measured found to have a pH value of 4.1.

Reference example 9.2: 30.04 grams of zeolitic material according to Reference Example 7.2 was thoroughly mixed with 59.97 grams deionized water and the pH was measured according to Reference Example 3 under stirring at 20° C. The suspension was found to have a pH value of 6.7. The suspension was allowed to stir under the same conditions for 24 hours and measured found to have a pH value of 6.8.

Reference example 9.3: 29.99 grams of zeolitic material according to Reference Example 7.3 was thoroughly mixed with 60.00 grams deionized water and the pH was measured according to Reference Example 3 under stirring at 20° C. The suspension was found to have a pH value of 5.8. The suspension was allowed to stir under the same conditions for 24 hours and measured found to have a pH value of 6.3.

Comparative Example 1: Mixture According to Example 1, Without Bidentate Organic Ligand 68.15 g deionized water having a conductivity of 5 to 20 microSiemens, determined as described in Reference Example 6, 11.26 g of an aqueous zirconium acetate (Zr(OAc)x) solution, having a zirconium content, calculated as $ZrO_2$, of 30 weight-%, and 70.63 g of a copper containing zeolitic material having framework structure CHA according to Reference Example 7.1 were admixed in this order and mixed to a homogenized suspension at a temperature of the suspension of 12 to 25° C.

The suspension was then stored for 18 hours at a temperature of the suspension of 20° C. and 30° C. for 2 hours followed by cooling to room temperature as described in Reference Example 5. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Comparative Example 2: Mixture According to Example 2, Without Bidentate Organic Ligand 67.44 g deionized water having a conductivity of 5 to 20 micro Siemens/cm, determined as described in Reference Example 6, 11.27 g of an aqueous zirconium acetate (Zr(OAc)x) solution (same as in Comparative Example 1), having a zirconium content, calculated as $ZrO_2$, of 30 weight-%, and 71.35 g of a copper containing zeolitic material having framework structure CHA according to Reference Example 7.2 were admixed in this order and mixed to a homogenized suspension at a temperature of the suspension of 12 to 25° C.

The suspension was then stored in the same way as the suspension of Comparative Example 1. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Comparative Example 3: Mixture According to Example 3, Without Bidentate Organic Ligand 69.30 g deionized water having a conductivity of 5 to 20 micro Siemens/cm, determined as described in Reference Example 6, 11.27 g of an aqueous zirconium acetate (Zr(OAc)x) solution (same as in Comparative Example 1), having a zirconium content, calculated as $ZrO_2$, of 30 weight-%, and 69.49 g of a copper containing zeolitic material having framework structure CHA according to Reference Example 7.3 were admixed in this order and mixed to a homogenized suspension at a temperature of the suspension of 12 to 25° C.

The suspension was then stored in the same way as the suspension of Comparative Example 1. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 1: Suspension According to the Invention

The suspension of Example 1 was prepared essentially as the suspension of Comparative Example 1, however with organic bidentate ligand added.

66.90 g deionized water having a conductivity of 5 to 20 micro Siemens/cm, determined as described in Reference Example 6, 1.26 g lactic acid (90 weight-%, obtained from Sigma-Aldrich), 11.26 g of an aqueous zirconium acetate (Zr(OAc)x) solution (same as in Comparative Example 1), having a zirconium content, calculated as $ZrO_2$, of 30 weight-%, and 70.66 g of a copper containing zeolitic material having framework structure CHA according to Reference Example 7.1 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.049. Further in the finally obtained suspension, the weight ratio of the bidentate organic ligand relative to the zirconium ion, calculated as zirconium (IV) oxide, ligand:Zr(IV), was 0.34.

The suspension was then stored in the same way as the suspension of Comparative Example 1. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 2: Suspension According to the Invention

The suspension of Example 2 was prepared essentially as the suspension of Comparative Example 2, however with organic bidentate ligand added.

66.19 g deionized water having a conductivity of 5 to 20 micro Siemens/cm, determined as described in Reference Example 6, 1.26 g lactic acid (90 weight-%, obtained from Sigma-Aldrich), 11.26 g of an aqueous zirconium acetate (Zr(OAc)x) solution (same as in Comparative Example 1), having a zirconium content, calculated as $ZrO_2$, of 30 weight-%, and 71.36 g of a copper containing zeolitic material having framework structure CHA according to Reference Example 7.2 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.047. Further in the finally obtained suspension, the weight ratio of the bidentate organic ligand relative to the zirconium ion, calculated as zirconium (IV) oxide, ligand:Zr(IV), was 0.34.

The suspension was then stored in the same way as the suspension of Comparative Example 1. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 3: Suspension According to the Invention

The suspension of Example 3 was prepared essentially as the suspension of Comparative Example 3, however with organic bidentate ligand added.

68.05 g deionized water having a conductivity of 150 to 200 micro Siemens/cm, determined as described in Reference Example 6, 1.27 g lactic acid (90 weight-%, obtained from Sigma-Aldrich), 11.28 g of an aqueous zirconium acetate (Zr(OAc)x) solution (same as in Comparative Example 1), having a zirconium content, calculated as $ZrO_2$, of 30 weight-%, and 69.48 g of a copper containing zeolitic material having framework structure CHA according to Reference Example 7.3 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.049. Further in the finally obtained suspension, the weight ratio of the bidentate organic ligand relative to the zirconium ion, calculated as zirconium (IV) oxide, ligand:Zr(IV), was 0.34.

The suspension was then stored in the same way as the suspension of Comparative Example 1. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 4: Suspension According to the Invention, as Example 1, with Added Alumina The suspension of Example 4 was prepared essentially as the suspension of Example 1, however with alumina added to maintain a constant total solid loading of 45 wt.-% calculated on the basis total weight of the suspension.

67.24 g deionized water having a conductivity of 150 to 200 micro Siemens/cm, determined as described in Reference Example 6, 1.26 g lactic acid (90 weight-%, obtained from Sigma-Aldrich), 11.27 g of an aqueous zirconium acetate (Zr(OAc)x) solution (same as in Comparative Example 1), having a zirconium content, calculated as $ZrO_2$, of 30 weight-%, 3.41 g of alumina (Bronsted acid, 1 micrometer<Dv90<10 micrometer), and 66.95 g of a copper containing zeolitic material having framework structure CHA according to Reference Example 7.1 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.051. Further in the finally obtained suspension, the weight ratio of the bidentate organic ligand relative to the zirconium ion, calculated as zirconium (IV) oxide, ligand:Zr(IV), was 0.34.

The suspension was then stored in the same way as the suspension of Comparative Example 4. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 5: Suspension According to the Invention, as Example 2, with Added Alumina The suspension of Example 5 was prepared essentially as the suspension of Example 2, however with alumina added to maintain a constant total solid loading of 45 wt.-% calculated on the basis total weight of the suspension.

66.57 g deionized water having a conductivity of 150 to 200 micro Siemens/cm, determined as described in Reference Example 6, 1.26 g lactic acid (90 weight-%, obtained from Sigma-Aldrich), 11.26 g of an aqueous zirconium acetate (Zr(OAc)x) solution (same as in Comparative Example 1), having a zirconium content, calculated as $ZrO_2$, of 30 weight-%, 3.39 g of alumina (Bronsted acid, 1 micrometer<Dv90<10 micrometer), and 67.59 g of a copper containing zeolitic material having framework structure CHA according to Reference Example 7.2 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.050. Further in the finally obtained suspension, the weight ratio of the bidentate organic ligand relative to the zirconium ion, calculated as zirconium (IV) oxide, ligand:Zr(IV), was 0.34.

The suspension was then stored in the same way as the suspension of Comparative Example 5. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 6: Suspension According to the Invention, as Example 3, with Added Alumina The suspension of Example 6 was prepared essentially as the suspension of Example 3, however with alumina added to maintain a constant total solid loading of 45 wt.-% calculated on the basis total weight of the suspension.

68.34 g deionized water having a conductivity of 150 to 200 micro Siemens/cm, determined as described in Reference Example 6, 1.27 g lactic acid (90 weight-%, obtained from Sigma-Aldrich), 11.26 g of an aqueous zirconium acetate (Zr(OAc)x) solution (same as in Comparative Example 1), having a zirconium content, calculated as $ZrO_2$, of 30 weight-%, 3.39 g of alumina (Bronsted acid, 1 micrometer<Dv90<10 micrometer), and 65.86 g of a copper containing zeolitic material having framework structure CHA according to Reference Example 7.3 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.051. Further in the finally obtained suspension, the weight ratio of the bidentate organic ligand relative to the zirconium ion, calculated as zirconium (IV) oxide, ligand:Zr(IV), was 0.34.

The suspension was then stored in the same way as the suspension of Comparative Example 6. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 7: Suspension According to the Invention, as Example 4, with a Higher Quantity of Organic Bidentate Ligand Added The suspension of Example 7 was prepared essentially as the suspension of Example 4, however with a higher quantity of organic bidentate ligand added.

65.98 g deionized water having a conductivity of 150 to 200 micro Siemens/cm, determined as described in Reference Example 6, 2.51 g lactic acid (90 weight-%, obtained from Sigma-Aldrich), 11.26 g of an aqueous zirconium acetate (Zr(OAc)x) solution (same as in Comparative Example 1), having a zirconium content, calculated as $ZrO_2$, of 30 weight-%, 3.39 g of alumina (Bronsted acid, 1 micrometer<Dv90<10 micrometer), and 66.92 g of a copper containing zeolitic material having framework structure CHA according to Reference Example 7.1 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.050. Further in the finally obtained suspension, the weight ratio of the bidentate organic ligand relative to the zirconium ion, calculated as zirconium (IV) oxide, ligand:Zr(IV), was 0.67.

The suspension was then stored in the same way as the suspension of Example 4. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 8: Suspension According to the Invention, as Example 5, with a Higher Quantity of Organic Bidentate Ligand Added The suspension of Example 8 was prepared essentially as the suspension of Example 5, however with a higher quantity of organic bidentate ligand added.

65.33 g deionized water having a conductivity of 150 to 200 micro Siemens/cm, determined as described in Reference Example 6, 2.53 g lactic acid (90 weight-%, obtained from Sigma-Aldrich), 11.29 g of an aqueous zirconium acetate (Zr(OAc)x) solution (same as in Comparative Example 1), having a zirconium content, calculated as $ZrO_2$, of 30 weight-%, 3.41 g of alumina (Bronsted acid, 1 micrometer<Dv90<10 micrometer; same as in Example), and 67.61 g of a copper containing zeolitic material having framework structure CHA according to Reference Example 7.2 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV): zeolitic material, was 0.050. Further in the finally obtained suspension, the weight ratio of the bidentate organic ligand relative to the zirconium ion, calculated as zirconium (IV) oxide, ligand:Zr(IV), was 0.67.

The suspension was then stored in the same way as the suspension of Example 5. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Example 9: Suspension According to the Invention, as Example 6, with a Higher Quantity of Organic Bidentate Ligand Added The suspension of Example 9 was prepared essentially as the suspension of Example 6, however with a higher quantity of organic bidentate ligand added.

67.08 g deionized water having a conductivity of 150 to 200 micro Siemens/cm, determined as described in Reference Example 6, 2.51 g lactic acid (90 weight-%, obtained from Sigma-Aldrich), 11.28 g of an aqueous zirconium acetate (Zr(OAc)x) solution (same as in Comparative Example 1), having a zirconium content, calculated as $ZrO_2$, of 30 weight-%, 3.41 g of alumina (Bronsted acid, 1 micrometer<Dv90<10 micrometer; same as in Example), and 65.84 g of a copper containing zeolitic material having framework structure CHA according to Reference Example 7.3 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV): zeolitic material, was 0.051. Further in the finally obtained suspension, the weight ratio of the bidentate organic ligand relative to the zirconium ion, calculated as zirconium (IV) oxide, ligand:Zr(IV), was 0.67.

The suspension was then stored in the same way as the suspension of Example 6. After storage and heating of a portion of the suspension as described in Reference Example 5, the viscosity before and after heating were determined according to reference example 4 and the pH of the suspension as determined as described in Reference Example 3. The pH and the viscosity results are shown in Table 3 below.

Comparative Example 4: Suspension According to Example 4, without Organic Bidentate Ligand The suspension of Comparative Example 4 was prepared essentially as the suspension of Example 4, however without the addition of organic bidentate ligand.

68.51 g deionized water having a conductivity of 150 to 200 micro Siemens/cm, determined as described in Reference Example 6, 11.27 g of an aqueous zirconium acetate (Zr(OAc)x) solution (same as in Comparative Example 1), having a zirconium content, calculated as $ZrO_2$, of 30 weight-%, 3.41 g of alumina (Bronsted acid, 1 micrometer<Dv90<10 micrometer), and 66.97 g of a copper containing zeolitic material having framework structure CHA according to Reference Example 7.1 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.050.

The suspension was then stored in the same way as the suspension of Example 4. After storage, the viscosity was determined as described in Reference Example 4 and the pH of the suspension was determined as described in Reference Example 3. The pH and the viscosity results are shown in Table 3 below.

Comparative Example 5: Suspension According to Example 5, without Organic Bidentate Ligand The suspension of Comparative Example 5 was prepared essentially as the suspension of Example 5, however without the addition of the organic bidentate ligand.

67.58 g deionized water having a conductivity of 150 to 200 micro Siemens/cm, determined as described in Reference Example 6, 11.28 g of an aqueous zirconium acetate (Zr(OAc)x) solution (same as in Comparative Example 1), having a zirconium content, calculated as $ZrO_2$, of 30 weight-%, 3.41 g of alumina (Bronsted acid, 1 micrometer<Dv90<10 micrometer), and 67.61 g of a copper containing zeolitic material having framework structure CHA according to Reference Example 7.2 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.050.

The suspension was then stored in the same way as the suspension of Example 4. After storage, the viscosity was determined as described in Reference Example 4 and the pH of the suspension was determined as described in Reference Example 3. The pH and the viscosity results are shown in Table 3 below.

Comparative Example 6: Suspension According to Example 6, without Organic Bidentate Ligand The suspension of Comparative Example 6 was prepared essentially as the suspension of Example 6, however without the addition of organic bidentate ligand.

69.59 g deionized water having a conductivity of 150 to 200 micro Siemens/cm, determined as described in Reference Example 6, 11.27 g of an aqueous zirconium acetate (Zr(OAc)x) solution (same as in Comparative Example 1), having a zirconium content, calculated as $ZrO_2$, of 30 weight-%, 3.41 g of alumina (Bronsted acid, 1 micrometer<Dv90<10 micrometer), and 65.87 g of a copper containing zeolitic material having framework structure CHA according to Reference Example 7.3 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.051.

The suspension was then stored in the same way as the suspension of Example 4. After storage, the viscosity was determined as described in Reference Example 4 and the pH of the suspension was determined as described in Reference Example 3. The pH and the viscosity results are shown in Table 3 below.

Example 10: Suspension According to the Invention, as Example 1, with a Higher Quantity of Organic Bidentate Ligand Added The suspension of Example 10 was prepared essentially as the suspension of Example 1, however with a higher quantity of organic bidentate ligand added.

65.66 g deionized water having a conductivity of 150 to 200 micro Siemens/cm, determined as described in Reference Example 6, 2.51 g lactic acid (90 weight-%, obtained from Sigma-Aldrich), 11.27 g of an aqueous zirconium acetate (Zr(OAc)x) solution (same as in Comparative Example 1), having a zirconium content, calculated as $ZrO_2$, of 30 weight-%, and 70.64 g of a copper containing zeolitic material having framework structure CHA according to Reference Example 7.1 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.048. Further in the finally obtained suspension, the weight ratio of the bidentate organic ligand relative to the zirconium ion, calculated as zirconium (IV) oxide, ligand:Zr(IV), was 0.67.

The suspension was then stored in the same way as the suspension of Example 1. After storage, the viscosity was determined as described in Reference Example 4 and the pH of the suspension was determined as described in Reference Example 3. The pH and the viscosity results are shown in Table 3 below.

Example 11: Suspension According to the Invention, as Example 2, With a Higher Quantity of Organic Bidentate Ligand Added The suspension of Example 11 was prepared essentially as the suspension of Example 2, however with a higher quantity of organic bidentate ligand added.

64.94 g deionized water having a conductivity of 150 to 200 micro Siemens/cm, determined as described in Reference Example 6, 2.52 g lactic acid (90 weight-%, obtained from Sigma-Aldrich), 11.26 g of an aqueous zirconium acetate (Zr(OAc)x) solution (same as in Comparative Example 1), having a zirconium content, calculated as $ZrO_2$, of 30 weight-%, and 71.35 g of a copper containing zeolitic material having framework structure CHA according to Reference Example 7.2 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.047. Further in the finally obtained suspension, the weight ratio of the bidentate organic ligand relative to the zirconium ion, calculated as zirconium (IV) oxide, ligand:Zr(IV), was 0.67.

The suspension was then stored in the same way as the suspension of Example 1. After storage, the viscosity was determined as described in Reference Example 4 and the pH of the suspension was determined as described in Reference Example 3. The pH and the viscosity results are shown in Table 3 below.

Example 12: Suspension According to the Invention, as Example 3, with a Higher Quantity of Organic Bidentate Ligand Added The suspension of Example 12 was prepared essentially as the suspension of Example 3, however with more organic bidentate ligand added.

66.80 g deionized water having a conductivity of 150 to 200 micro Siemens/cm, determined as described in Reference Example 6, 2.52 g lactic acid (90 weight-%, obtained from Sigma-Aldrich), 11.26 g of an aqueous zirconium acetate (Zr(OAc)x) solution (same as in Comparative Example 1), having a zirconium content, calculated as $ZrO_2$, of 30 weight-%, and 69.49 g of a copper containing zeolitic material having framework structure CHA according to Reference Example 7.3 were admixed in this order and mixed to a homogenized suspension at a temperature of the suspension of 12 to 25° C. In the finally obtained suspension, the weight ratio of the zirconium ion comprised in the obtained complex, calculated as zirconium (IV) oxide, relative to the total weight of the framework Si, Al and O of the zeolitic material, Zr(IV):zeolitic material, was 0.049. Further in the finally obtained suspension, the weight ratio of the bidentate organic ligand relative to the zirconium ion, calculated as zirconium (IV) oxide, ligand:Zr(IV), was 0.67.

The suspension was then stored in the same way as the suspension of Example 1. After storage, the viscosity was determined as described in Reference Example 4 and the pH of the suspension was determined as described in Reference Example 3. The pH and the viscosity results are shown in Table 3 below.

TABLE 3

Stability evaluation for examples for the initial storage followed by heating according to Reference Ex 5

| Example | Zeolite | pH | Total solid ratio* [$ZrO_2$:$Al_2O_3$:CuCHA] | | | Ligand Wt.-% | Viscosity (mPa · s) initial storage shear rate | | | | Viscosity (mPa · s) heated storage shear rate | | | |
|---|---|---|---|---|---|---|---|---|---|---|---|---|---|---|
| | | | $ZrO_2$ | $Al_2O_3$ | CuCHA | | $10\ s^{-1}$ | $50\ s^{-1}$ | $100\ s^{-1}$ | $316\ s^{-1}$ | $10\ s^{-1}$ | $50\ s^{-1}$ | $100\ s^{-1}$ | $316\ s^{-1}$ |
| Co Ex 1 | Ref Ex 7.1 | 4.5 | 5 | 0 | 95 | 0 | 223 | 279 | 499 | 1480 | 547 | 507 | 797 | 1740 |
| Co Ex 2 | Ref Ex 7.2 | 5.5 | 5 | 0 | 95 | 0 | 973 | 405 | 330 | 271 | 944 | 428 | 363 | 315 |
| Co Ex 3 | Ref Ex 7.3 | 4.7 | 5 | 0 | 95 | 0 | 406 | 587 | 832 | 1510 | 1130 | 926 | 1100 | 1700 |

TABLE 3-continued

Stability evaluation for examples for the initial storage followed by heating according to Reference Ex 5

| Example | Zeolite | pH | Total solid ratio* [ZrO$_2$:Al$_2$O$_3$:CuCHA] ZrO$_2$:Al$_2$O$_3$:CuCHA | | | Ligand Wt.-% | Viscosity (mPa · s) initial storage shear rate | | | | Viscosity (mPa · s) heated storage shear rate | | | |
|---|---|---|---|---|---|---|---|---|---|---|---|---|---|---|
| | | | | | | | 10 s$^{-1}$ | 50 s$^{-1}$ | 100 s$^{-1}$ | 316 s$^{-1}$ | 10 s$^{-1}$ | 50 s$^{-1}$ | 100 s$^{-1}$ | 316 s$^{-1}$ |
| Ex 1 | Ref Ex 7.1 | 4.3 | 5 | 0 | 95 | 0.75 | 400 | 1070 | 1210 | 1270 | 438 | 1210 | 1340 | 1380 |
| Ex 2 | Ref Ex 7.2 | 5.2 | 5 | 0 | 95 | 0.75 | 64 | 59 | 67 | 86 | 202 | 130 | 127 | 135 |
| Ex 3 | Ref Ex 7.3 | 4.5 | 5 | 0 | 95 | 0.75 | 554 | 1030 | 1270 | 1540 | 475 | 937 | 1180 | 1440 |
| Ex 4 | Ref Ex 7.1 | 4.3 | 5 | 5 | 90 | 0.75 | 2060 | 1790 | 1680 | 1510 | 3100 | 2470 | 2270 | 2070 |
| Ex 5 | Ref Ex 7.2 | 5.2 | 5 | 5 | 90 | 0.75 | 35 | 42 | 51 | 71 | 82 | 64 | 67 | 81 |
| Ex 6 | Ref Ex 7.3 | 4.4 | 5 | 5 | 90 | 0.75 | 3850 | 2450 | 2200 | 1910 | 4430 | 3010 | 2610 | 2150 |
| Ex 7 | Ref Ex 7.1 | 4.2 | 5 | 5 | 90 | 1.50 | 2480 | 1450 | 1200 | 994 | 3970 | 2820 | 2460 | 1960 |
| Ex 8 | Ref Ex 7.2 | 4.9 | 5 | 5 | 90 | 1.50 | 31 | 33 | 40 | 60 | 30 | 32 | 39 | 60 |
| Ex 9 | Ref Ex 7.3 | 4.3 | 5 | 5 | 90 | 1.50 | 3480 | 2010 | 1640 | 1150 | 4800 | 2870 | 2360 | 1810 |
| Co Ex 4 | Ref Ex 7.1 | 4.4 | 5 | 5 | 90 | 0 | 316 | 266 | 408 | 1590 | n/a | n/a | n/a | n/a |
| Co Ex 5 | Ref Ex 7.2 | 5.5 | 5 | 5 | 90 | 0 | 1260 | 537 | 450 | 396 | n/a | n/a | n/a | n/a |
| Co Ex 6 | Ref Ex 7.3 | 4.5 | 5 | 5 | 90 | 0 | 1480 | 924 | 987 | 1390 | n/a | n/a | n/a | n/a |
| Ex 10 | Ref Ex 7.1 | 4.1 | 5 | 0 | 95 | 1.50 | 1100 | 824 | 779 | 620 | n/a | n/a | n/a | n/a |
| Ex 11 | Ref Ex 7.2 | 4.8 | 5 | 0 | 95 | 1.50 | 21 | 29 | 38 | 62 | n/a | n/a | n/a | n/a |
| Ex 12 | Ref Ex 7.3 | 4.2 | 5 | 0 | 95 | 1.50 | 747 | 762 | 903 | 1100 | n/a | n/a | n/a | n/a |

Table 3 *The total solid ratio is given on a weight to weight basis for a 45 wt. % total solid loading of each example.

The invention claimed is:

1. An aqueous suspension comprising:
   (i) water;
   (ii) a zeolitic material and one or more ions of copper and iron, wherein the copper and iron is either comprised in the zeolitic material, in a source of copper and iron, or in the zeolitic material and in a source of one or more of copper and iron; and
   (iii) an aqueous chelate complex solution comprising a zirconium ion and a bidentate organic ligand bonded to the zirconium ion via zirconium oxygen bonds from two oxygen atoms comprised in the ligand.

2. The suspension of claim 1, wherein the zeolitic material according to (ii) has framework type chosen from ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWW, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof.

3. The suspension of claim 1, wherein from 95 wt. % to 100 wt. %, of the framework structure of the zeolitic material according to (ii) consist of Si, Al, O, and optionally one or more of H and P, and wherein the framework structure of the zeolitic material according to (ii), comprises the molar ratio of Si to Al, calculated as SiO$_2$:Al$_2$O$_3$ range from 2:1 to 50:1.

4. The suspension of claim 1, wherein according to (ii), the suspension comprises a zeolitic material and copper, wherein the copper is comprised in the zeolitic material, in a source of copper, or in the zeolitic material and in a source of copper.

5. The suspension of claim 4, wherein the suspension according to (iii) does not comprise a source of copper, in addition to the zeolitic material comprising copper.

6. The suspension of claim 1, wherein the bidentate organic ligand according to (iii) comprises one or more of an alpha hydroxy acid, a beta hydroxy acid, a 2,4-diketone, and a 1,3-dicarbonyl compound.

7. The suspension of claim 1, wherein the bidentate organic ligand according to (iii) consists of the elements carbon, hydrogen and oxygen.

8. The suspension of claim 1, wherein the weight ratio of the water employed according to (i) relative to the total weight of Si, Al and O of the zeolitic material framework structure employed according to (ii), weight(water):weight (total sum of Si, Al and O of the zeolitic material), ranges from 80:20 to 40:60.

9. The suspension claim 1, wherein the weight ratio of the zirconium ion comprised in the complex according to (iii), calculated as zirconium (IV) oxide, relative to the total weight of Si, Al and O of the zeolitic material framework structure according to (ii), weight(zirconium oxide): weight (total sum of framework Si, Al and O of the zeolitic material), ranges from 0.02:1 to 0.1:1.

10. The suspension of claim 1, wherein the weight ratio of the bidentate organic ligand relative to the zirconium ion, calculated as zirconium (IV) oxide ranges from 0.01 to 2.0.

11. The suspension claim 1, wherein the liquid phase of the suspension has a pH ranging from 0 to 12, determined at 100 s-1.

12. The suspension of claim 1, further comprising:
   (iv) at least one refractory metal oxide or a precursor thereof,
   wherein the refractory metal oxide or precursor thereof comprises one or more of an alumina, a silica, a titania, an aluminum hydroxide, an aluminum oxyhydroxide, an aluminum salt, a colloidal alumina, a silicon alcoholate, a colloidal silica, a fumed silica, a water glass, a titanium alcoholate, and a colloidal titania wherein the weight ratio of the refractory metal oxide or precursor thereof relative to the total weight of the framework Si, Al and O of the zeolitic material, weight (iv):weight(total sum of framework Si, Al and O of the zeolitic material), ranges from 0.01:1 to 0.13:1.

13. The suspension of claim 12, wherein the liquid phase of the suspension has a pH ranging from 0 to 12, and having a viscosity ranging from 2 mPas to 1000 mPas, determined at 100 s-1.

14. The suspension of claim 1, wherein the zeolitic material according to (ii) has a particle size distribution with a Dv90 value ranging from 0.5 micrometer to 100 micrometer.

15. The suspension of claim 1, wherein the suspension has a storage stability ranging from 1 d to 120 d.

16. The aqueous suspension according to claim 1, wherein the aqueous suspension is prepared as a selective catalytic reduction catalyst, or as a selective catalytic reduction catalyst for the treatment of the exhaust gas stream of a diesel engine.

17. A process for preparing an aqueous suspension, wherein the process comprises:
(a) mixing water and a zirconium salt;
(b) adding a bidentate organic ligand to the mixture obtained from (a), and obtaining an aqueous chelate complex solution comprising a zirconium ion and the bidentate organic ligand bonded to the zirconium ion via zirconium oxygen bonds from two oxygen atoms comprised in the ligand; and
(c) adding a zeolitic material and one or more ions of copper and iron to the aqueous solution obtained from (b), and obtaining an aqueous suspension, wherein the copper and iron is either comprised in the zeolitic material, or in a source of copper and iron, or in the zeolitic material and in a source of copper and iron.

* * * * *